United States Patent
Yaman et al.

(10) Patent No.: US 11,888,583 B2
(45) Date of Patent: Jan. 30, 2024

(54) INTEGRATED 3-WAY BRANCHING UNIT SWITCH MODULE HAVING SMALL FOOTPRINT

(71) Applicant: NEC Laboratories America, Inc., Princeton, NJ (US)

(72) Inventors: Fatih Yaman, Princeton, NJ (US); Shinsuke Fujisawa, Princeton, NJ (US); Hussam Batshon, Monroe, NJ (US); Takigawa Yoshinari, Tokyo (JP); Ryuji Aida, Tokyo (JP); Takanori Inoue, Tokyo (JP); Eduardo Rodriguez, Tokyo (JP); Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/543,616

(22) Filed: Dec. 6, 2021

(65) Prior Publication Data

US 2022/0182170 A1 Jun. 9, 2022

Related U.S. Application Data

(60) Provisional application No. 63/122,011, filed on Dec. 7, 2020.

(51) Int. Cl.
*H04Q 11/00* (2006.01)
*H04J 14/02* (2006.01)
*G02B 6/44* (2006.01)
*G02B 6/50* (2006.01)

(52) U.S. Cl.
CPC ........ *H04J 14/0221* (2013.01); *G02B 6/4427* (2013.01); *H04Q 11/0001* (2013.01); *G02B 6/506* (2013.01)

(58) Field of Classification Search
None
See application file for complete search history.

(56) References Cited

U.S. PATENT DOCUMENTS

| | | | | |
|---|---|---|---|---|
| 5,321,774 A | * | 6/1994 | Barnard | G02F 1/31 385/11 |
| 5,448,660 A | * | 9/1995 | Calvani | H04J 14/0206 385/20 |
| 6,377,373 B1 | * | 4/2002 | Kawazawa | H04B 10/27 398/82 |
| 7,277,639 B2 | * | 10/2007 | Kim | H04J 14/0213 398/83 |
| 8,798,473 B2 | * | 8/2014 | Inoue | H04B 10/27 398/94 |
| 9,712,274 B2 | * | 7/2017 | Thoguluva | H04B 10/278 |
| 9,800,329 B2 | * | 10/2017 | Hibino | H04B 10/0771 |
| 9,882,671 B2 | * | 1/2018 | Nakada | H04J 14/0221 |
| 10,003,425 B2 | * | 6/2018 | Abbott | H04J 14/0206 |
| 10,707,957 B2 | * | 7/2020 | Frisch | H04Q 11/0062 |
| 10,771,179 B1 | * | 9/2020 | Marcenac | H04B 10/25891 |
| 2002/0057477 A1 | * | 5/2002 | Rocca | H04J 14/0279 398/104 |
| 2011/0317997 A1 | * | 12/2011 | Satou | H04J 14/0289 398/20 |
| 2016/0315701 A1 | * | 10/2016 | Yuki | H04J 14/0212 |
| 2021/0302660 A1 | * | 9/2021 | Garrett | H04J 14/0275 |
| 2021/0302678 A1 | * | 9/2021 | Garrett | H04J 14/0205 |

\* cited by examiner

*Primary Examiner* — Jai M Lee
(74) *Attorney, Agent, or Firm* — Joseph Kolodka

(57) ABSTRACT

Aspects of the present disclosure describe systems, methods, and structures directed to an integrated 3-way branching unit switch module suitable for undersea application.

7 Claims, 25 Drawing Sheets

INTEGRATED 3-WAY BRANCHING UNIT SWITCH MODULE HAVING SMALL FOOTPRINT

CROSS REFERENCE TO RELATED APPLICATIONS

This application claims the benefit of U.S. Provisional Patent Application Ser. No. 63/122,011 filed 7 Dec. 2020 the entire contents of which is incorporated by reference as if set forth at length herein.

TECHNICAL FIELD

This disclosure relates generally to optical communications systems, methods, and structures. More particularly, it describes an integrated 3-way branching unit switch module having a small footprint particularly applicable to undersea applications.

BACKGROUND

As is known in the optical communications arts, undersea optical communications facilities and cables are an increasingly important component of global communications—including Internet. Branching units are particularly important components of such undersea facilities. Given this importance, improved branching units would represent a welcome addition to the art.

SUMMARY

An advance in the art is made according to aspects of the present disclosure directed to an integrated 3-way branching unit switch module having a small footprint that is particularly well suited for undersea applications.

In sharp contrast to the prior art, systems, methods, and structures according to the present disclosure are directed to: A 3-way branching unit switch module for undersea optical communications configured to be connected to first, second, and third optical cables, each of the optical cables in optical communication with a respective landing station A, B, or C, the module comprising: a first pair of switches in optical communication with the first optical cable; a second pair of switches in optical communication with the second optical cable; and a third pair of switches in optical communications with the third optical cable; wherein the first, second and third pair of switches each have one switch of their pair in optical communication with one of the other two pair of switches and the first, second and third pair of switches each have the other switch in their pair in optical communication with the other one of the other two pair of switches.

BRIEF DESCRIPTION OF THE DRAWING

A more complete understanding of the present disclosure may be realized by reference to the accompanying drawing in which:

FIG. 15 (A) the two states of the 2×2 switch configuration used in FIG. 13); and FIG. 15 (B) the two states of the 2×2 switch configuration used in FIG. 14, according to aspects of the present disclosure;

Figure 1:
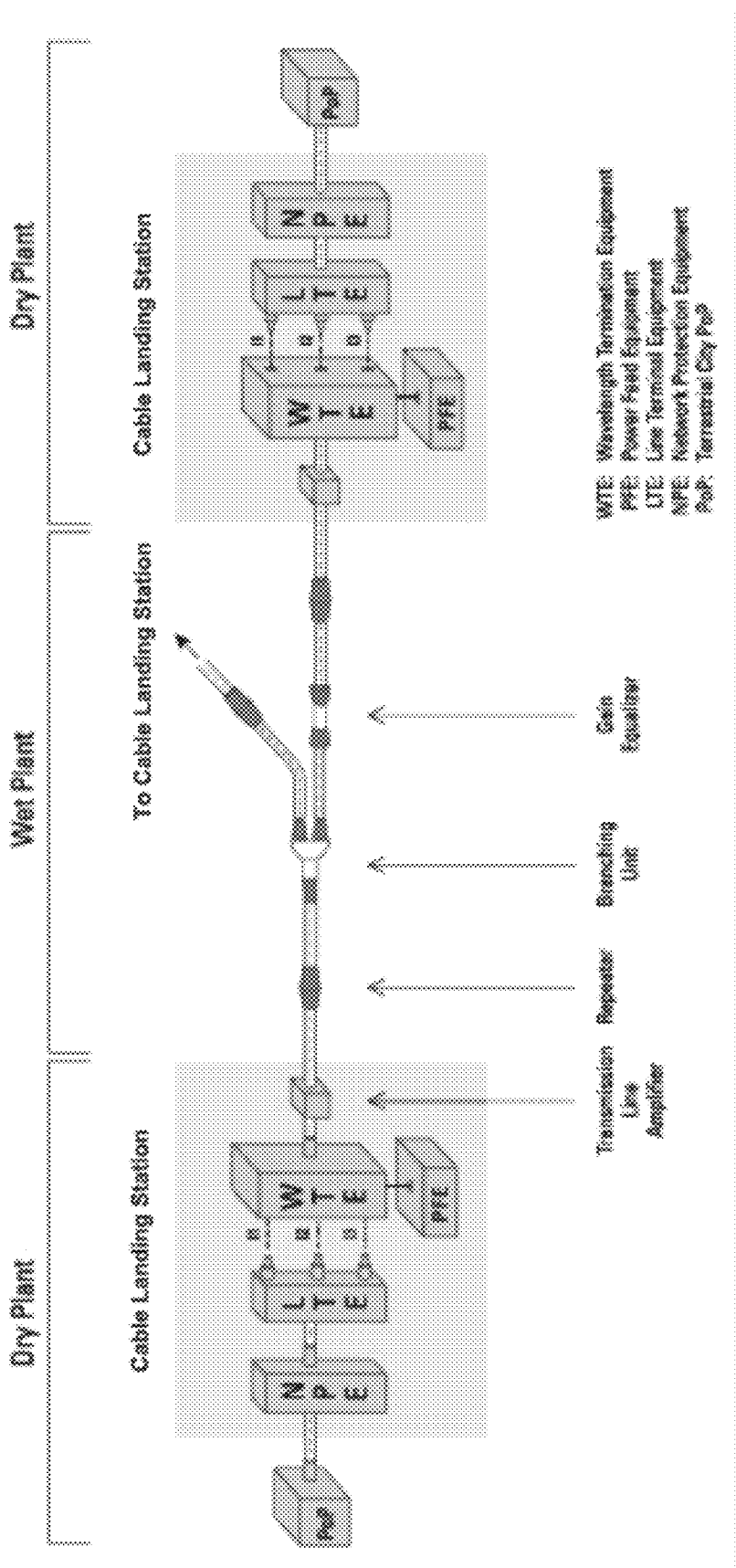
FIG. 1 is a schematic diagram of a submarine optical fiber cable system as is known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

As we shall show and describe, aspects of the present disclosure include an underwater communication cable (i.e., undersea) branching unit (BU) that provides a path diversity together with improved connectivity while advantageously exhibiting a small footprint design including a housing unit much smaller than provided in the art.

By way of some additional background—and with reference to FIG. 1, which is a schematic diagram of an illustrative submarine fiber optic telecommunications cable system generally known in the art. Referring to that FIG. 1, data to be transmitted originates in one of the cable stations. It is delivered to the other cable stations across the sea via submarine cable.

As those skilled in the art will readily appreciate and as may be observed by inspection of this figure, submarine cables have mainly two parts. 1) a cable span, and 2) repeaters. The cable span can be 40 km to 150 km or longer, but typically in the 50-80 km range. Oftentimes, such cable spans are simply referred in the art as spans.

While a cable span includes several elements as shown, for our purposes herein a main part of our concern regards the optical fiber cables. As is known in the art, optical fibers are very thin strands of glass that can guide light with low attenuation. Optical fibers are very thin, exhibiting only about 250 microns diameter typically.

Generally, optical fibers are made of pure silica glass having a substantially cylindrical shape. Light is guided through a doped center core that is surrounded by a cladding.

Typically, the core diameter is of the order of 5-12 micrometers, and the cladding diameter is about 125 micrometers. The glass section is further coated by polymers to protect it which typically brings the overall diameter to 250 micrometers.

In general, fiber optic cables may include a multitude of individual fibers. Each individual fiber can carry additional data. The data capacity is therefore substantially proportional to the number of fibers in the cable.

Since the optical fibers are very thin, in principal the capacity of the cable can be increased dramatically by adding more fibers. However, this is not the case because of power limitations of the fiber optic transmission systems employing the fiber optic cables. Fibers have low attenuation, and as a result of such low attenuation, the optical power can drop to 1% after only 1 span. Therefore, after one span, light traversing the fiber needs to be amplified.

Amplification is done by active amplifier components that generally are housed in another main component of submarine cable systems called repeaters. Inside the repeaters there are typically one amplifier dedicated to each fiber. One of the limitations to the number of fibers that can be supported by the cable system is the number of amplifiers that can be housed by a repeater. The other limitation is the limited electrical power that exists in undersea systems.

As is known, each amplifier uses electricity to amplify the optical power. Such electrical power necessarily must be supplied from each end of an undersea cable system which can be several thousand km long.

Note further in FIG. 1 elements known in the art as branching units (BUs). These branching units are typically located in an undersea location. They include components that allow traffic to be directed in multiple directions. Such direction/redirection is generally achieved by switches that may or may not be wavelength selective. As will be readily understood and appreciated by those skilled in the art, components such as Bus are placed in a housing which protects them from the undersea environment.

We note that there is generally a limitation of a maximum size of the housing that can be installed underwater—which is also related to cost. Since a larger housing generally costs more, it is advantageous to have a switching design that is smaller in size. Another factor that contributes to the size of the housing is the number of fiber pairs in the cable. The larger the number of fiber pairs that needs to have the switching function, the more switching components need to be allocated in the housing, and the larger the housing size needs to be.

As we shall show and describe, our inventive concepts disclosed herein provide for a fiber optic cable transmission system that has improved path diversity in case there is a failure or breakage in part of the link. Our approach achieves this while at the same time retain maximum achievable capacity while keeping overall system cost at a minimum.

Of relevance to the present disclosure are the branching units (BUs)—that are typically located under water. Branching units typically include several "arms" and components that allow optical telecommunications traffic to be directed in either of the arms. Such functionality is typically provided by components including switches in the BUs that may or may not be wavelength selective. These components are placed in a waterproof/rugged BU housing which protects them from the environment. An illustrative example of such BU housing is shown in FIG. 1.

Those skilled in the art will readily understand and appreciate that there is a practical limitation on the maximum size of a BU housing that can be installed underwater—which is also related to its cost. Generally, larger housings generally cost more. Accordingly, it is desirable to have a switching unit exhibiting a small size. Still another factor that contributes to the size of the housing is the number of fiber pairs in the undersea cable. The larger the number of fiber pairs that needs to have the switching function, the more switching components need to be allocated in the housing, and the larger the housing size needs to be.

As those skilled in the art will further appreciate, submarine/undersea optical cable transmission systems should exhibit sufficient/improved path diversity for those unpredictable instances when there is a failure. Such diversity should be provided while maintaining a maximum achievable capacity (connectivity) at a relatively low cost.

Figure 2:
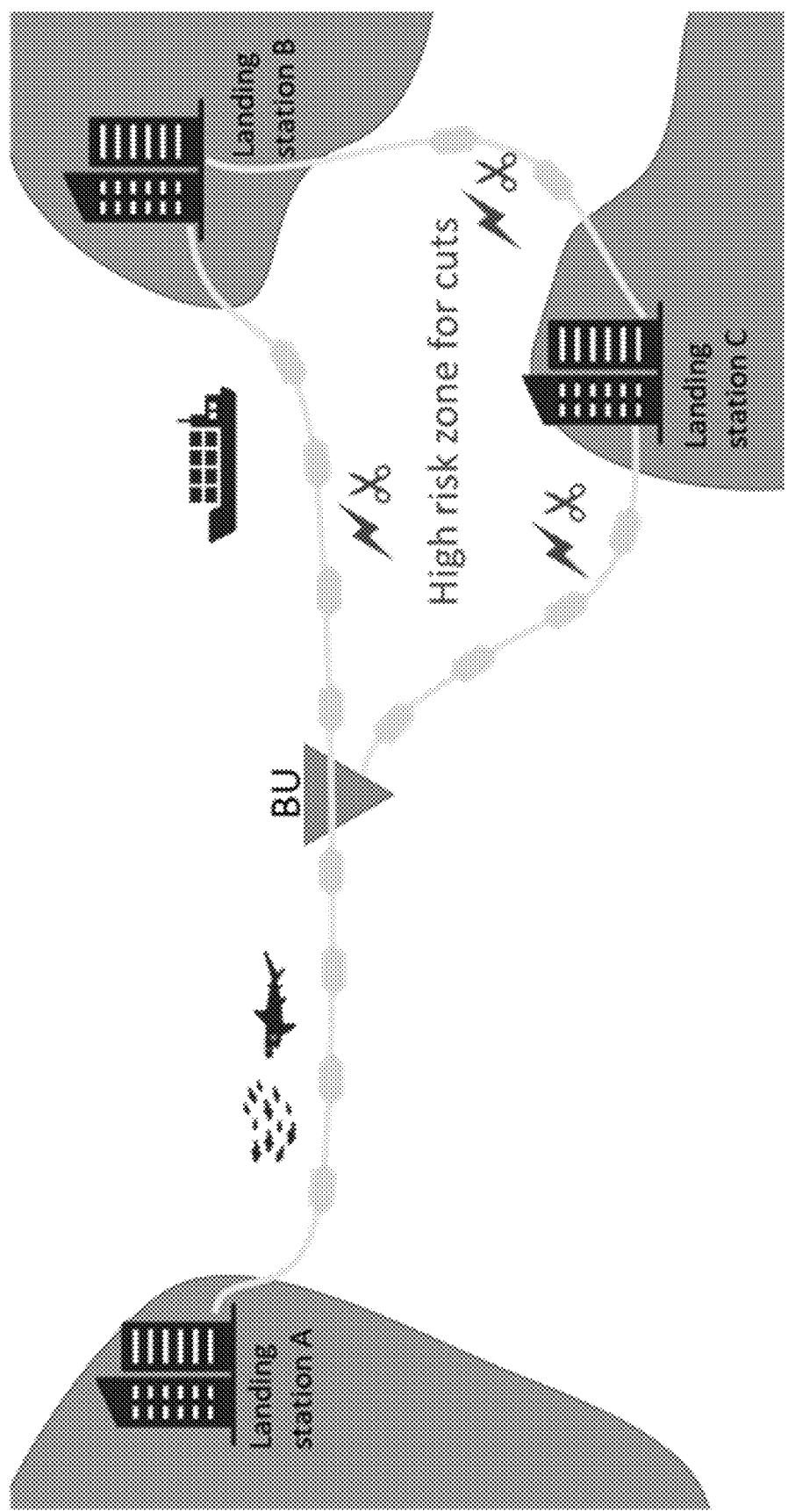
FIG. 2 is a plot of a GAWBS spectrum according to aspects of the present disclosure.

FIG. 2 is a schematic diagram of an illustrative submarine fiber optic telecommunications cable system where path diversity is achieved by a branching unit according to aspects of the present disclosure. As shown in the figure and as will be readily appreciated by those skilled in the art, the figure illustrates an example where path diversity can help to improve connectivity. More particularly, instead of connecting landing station A to only landing station B where most traffic might be needed, it can be split into two paths using a BU and connect A to both B and C, and then B to C.

Of course, in some cases a connection between B and C might already exist through a submarine cable, or terrestrial networks. In case there is breakage in a high-risk area such as between BU and B or BU and C or between B and C, one can utilize an alternate route and maintain connectivity during repair. To achieve this functionality, at the BU one should be able to direct the traffic from A to B, or from A to C or from B to C. We call this functionality 3-way switching (3WS)

As previously noted, submarine cables of a submarine system typically have multiple fiber pairs. Each fiber in a pair transport traffic between the same two end points in opposite directions. In some configurations, there are the same number of fiber pairs connected to all three cables connected to the BU. This could be because of cost considerations or limitation of the maximum number of fiber pairs that can be accommodated in cables.

In those situations where there is a breakage between BU and B, all traffic might be connected between A and C. However, in cases where there is no breakage, cable operators might redistribute traffic between AB, AC, and BC depending on traffic load. Those skilled in the art will readily understand and appreciate that it is preferable to have control over how much capacity is allocated between connections, however, a total achievable capacity may depend on the settings.

Figure 3:
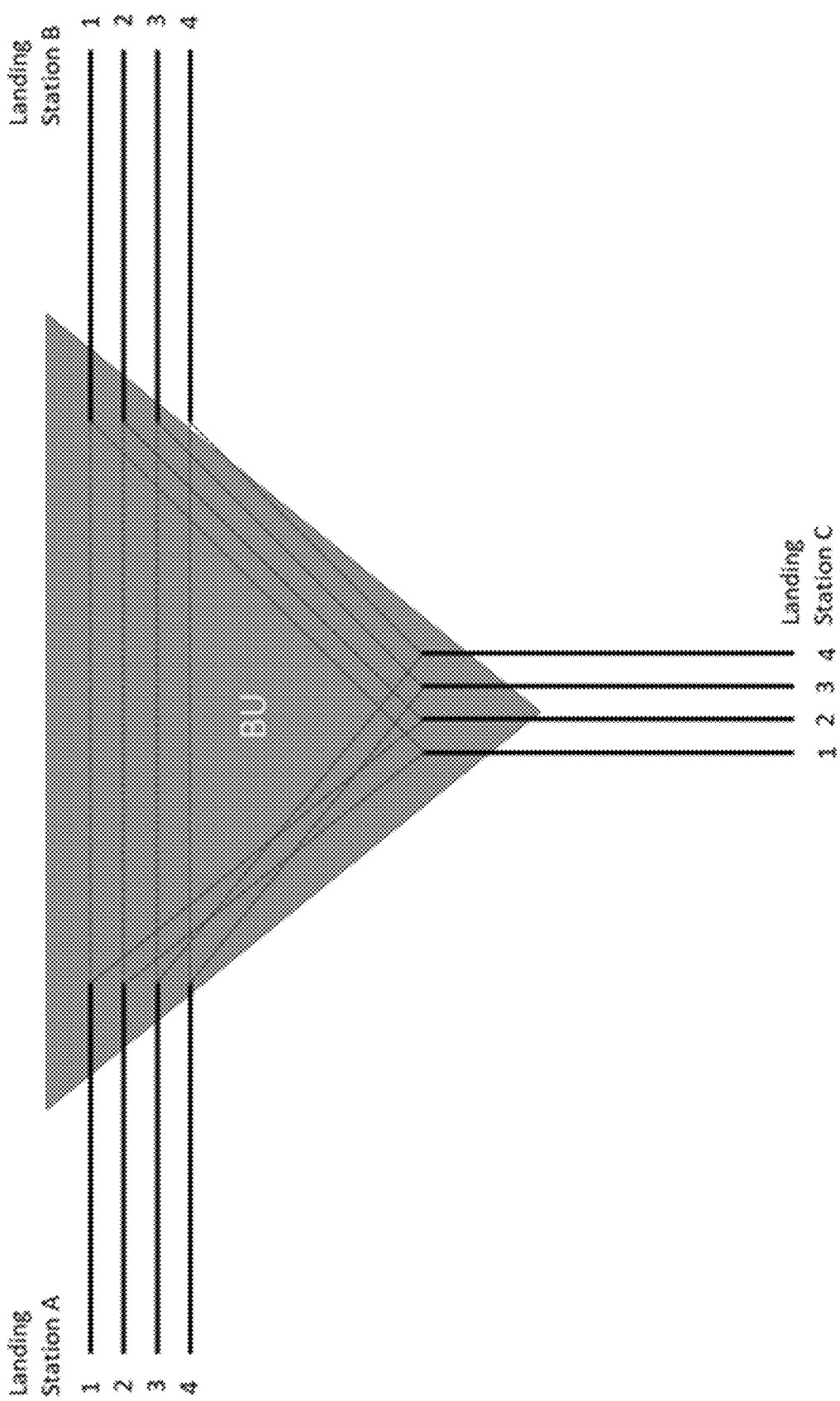
FIG. 3 is a schematic BU connectivity diagram showing fiber pairs and dashed lines indicating possible connection paths according to aspects of the present disclosure.

FIG. 3 is a schematic diagram illustrating BU connectivity in which each solid line corresponds to a fiber pair while dashed lines show possible connection paths according to aspects of the present disclosure.

FIG. 3 shows the connectivity diagram that can achieve this functionality for a 4-fiber pair system. With reference to that figure, and as an example, the traffic in fiber pair 1 from A can be connected to either fiber pair 1 in B or fiber pair 2 in C; the traffic in fiber pair 1 from B can be connected to either fiber pair 1 in A or fiber pair 1 in C; the traffic in fiber pair 1 from C can be connected to either fiber pair 1 in B or fiber pair 2 in A; the traffic in fiber pair 2 from A can be connected to either fiber pair 2 in B or fiber pair 1 in C; the traffic in fiber pair 2 from C can be connected to either fiber pair 1 in A or fiber pair 2 in B. To find the connections for the fiber pair 3 and 4 one can replace 1 with 3 and 2 with 4.

The connection diagram in FIG. 3 shows that this design can be further simplified if it is noticed that the switching is confined to a couple of fiber pairs. For instance, in the example of FIG. 3, switching is confined between the couple of fiber pairs 1 and 2, a separate one is between couples of fiber pairs 3 and 4 etc. Even if the cable has many fiber pairs, for instance 24 or 36, the switching will happen only between a group of two fiber pairs. From here on we will call these a switching group.

Figure 4A:
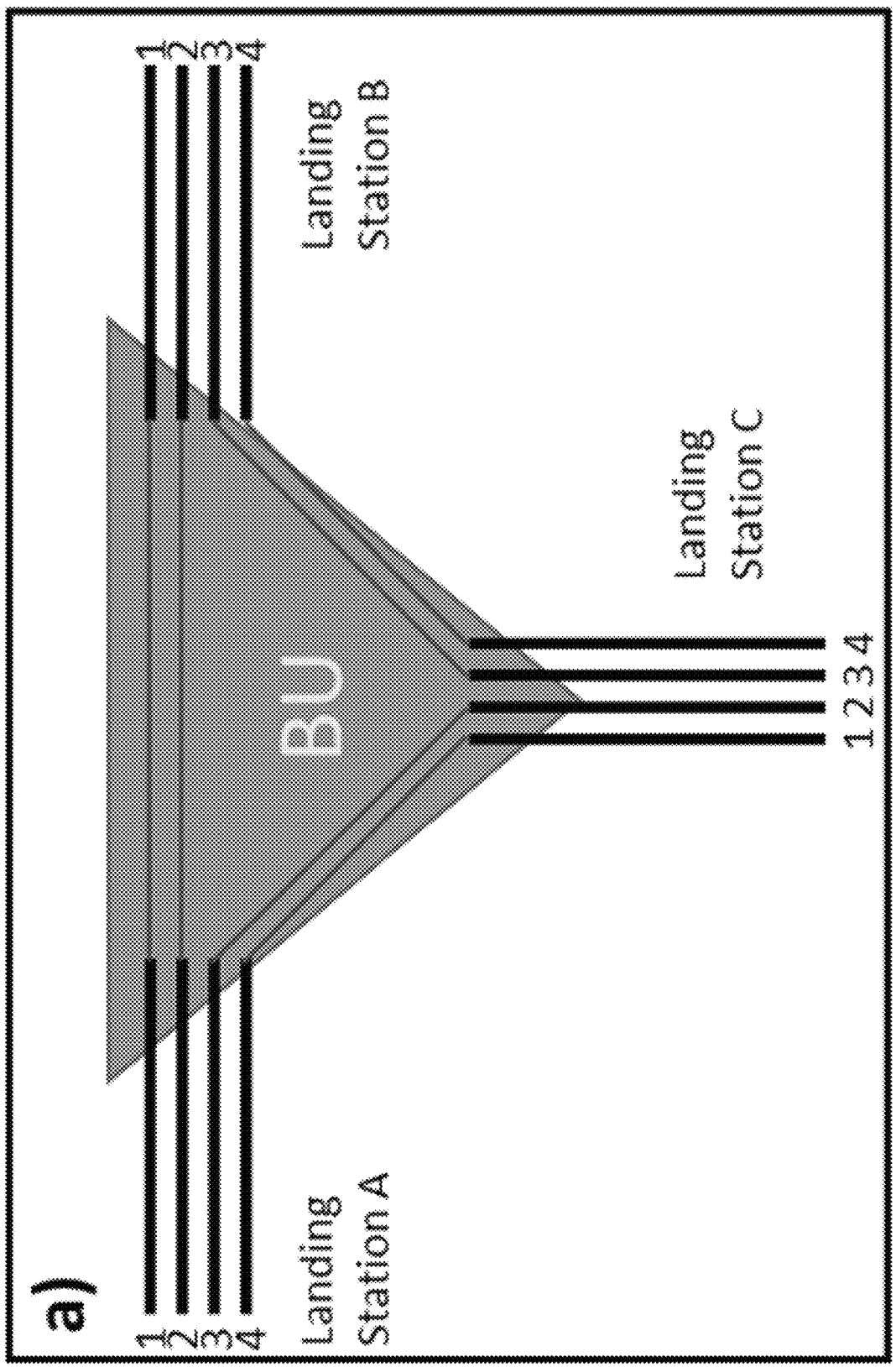
FIG. 4(A) and FIG. 4(B) are schematic diagrams illustrating BU connectivity diagram for a BU without switches and with 1×2 switches connected to a side connected to Landing station A. Shown are the 1×2 switches, solid lines show the occupied paths in the BU and dotted lines show the unoccupied paths, grayed-out fibers show the fibers that are not carrying traffic.
Figure 4B:
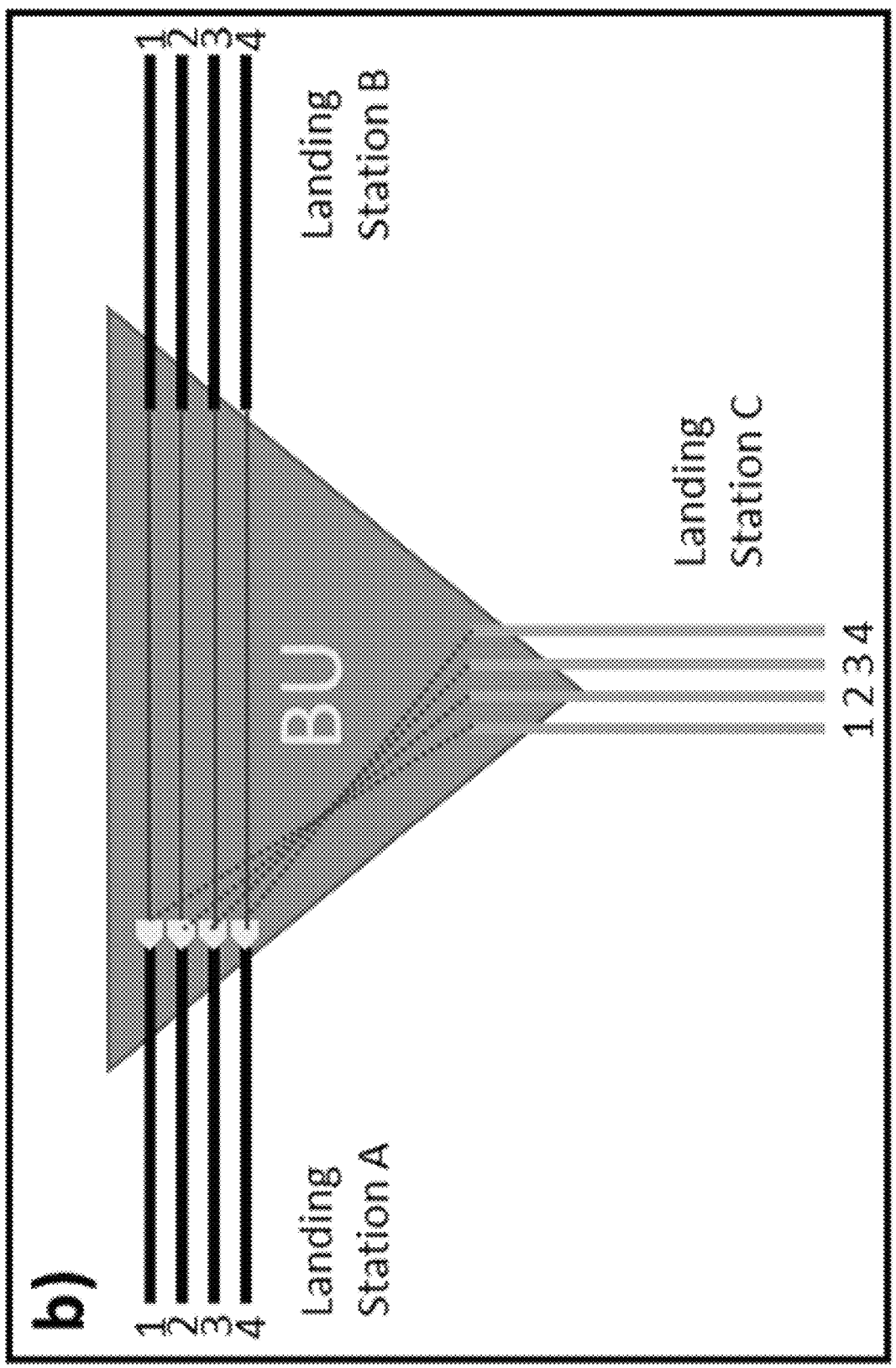

FIG. 4(A) and FIG. 4(B) are schematic diagrams illustrating BU connectivity diagram for a BU without switches and with 1×2 switches connected to a side connected to Landing station A. Shown are the 1×2 switches, solid lines show the occupied paths in the BU and dotted lines show the unoccupied paths, grayed-out fibers show the fibers that are not carrying traffic.

From that figure, it may be deduced the benefits of using switches in BUs. As shown in FIG. 4(A), there are no switches. The connections can be set up in different ways, but if desired, in this case it is possible to have maximum connectivity. By maximum connectivity we mean all the fiber pairs are connected and capable of carrying traffic. In this example of a 4-fiber pair system there are a total of 6 connections carrying traffic. Unfortunately, however there is a major disadvantage to this configuration. In case there is a fault in any of the connections, 4 out of 6 connections would be lost. There is no way to protect against such a scenario. As an example, if there is a breakage between BU and landing station C, ideally, we would want to redirect all the traffic to link AC, but we cannot. In many cases one of the paths have more priority than the others. For instance, the landing station might be significantly further than the BU compared to B or C. In such cases making sure traffic is connected to either B or C is important. This can be achieved by adding switches as shown in FIG. 4(B). Here the switches are 1×2 switches as they tend to be the most reliable, cost and space saving. With these switches in place, if there is a breakage either between BU and B or between BU and C all the traffic can be switches to the healthy side until repairs are finished. However, the downside is that when there is no breakage, the maximum number of connectivity is limited to only 4 connections. As it can be seen in FIG. 4(B), 4 fiber pairs need to just wait with no connectivity, just in case of a failure on the other branch.

Figure 5A:
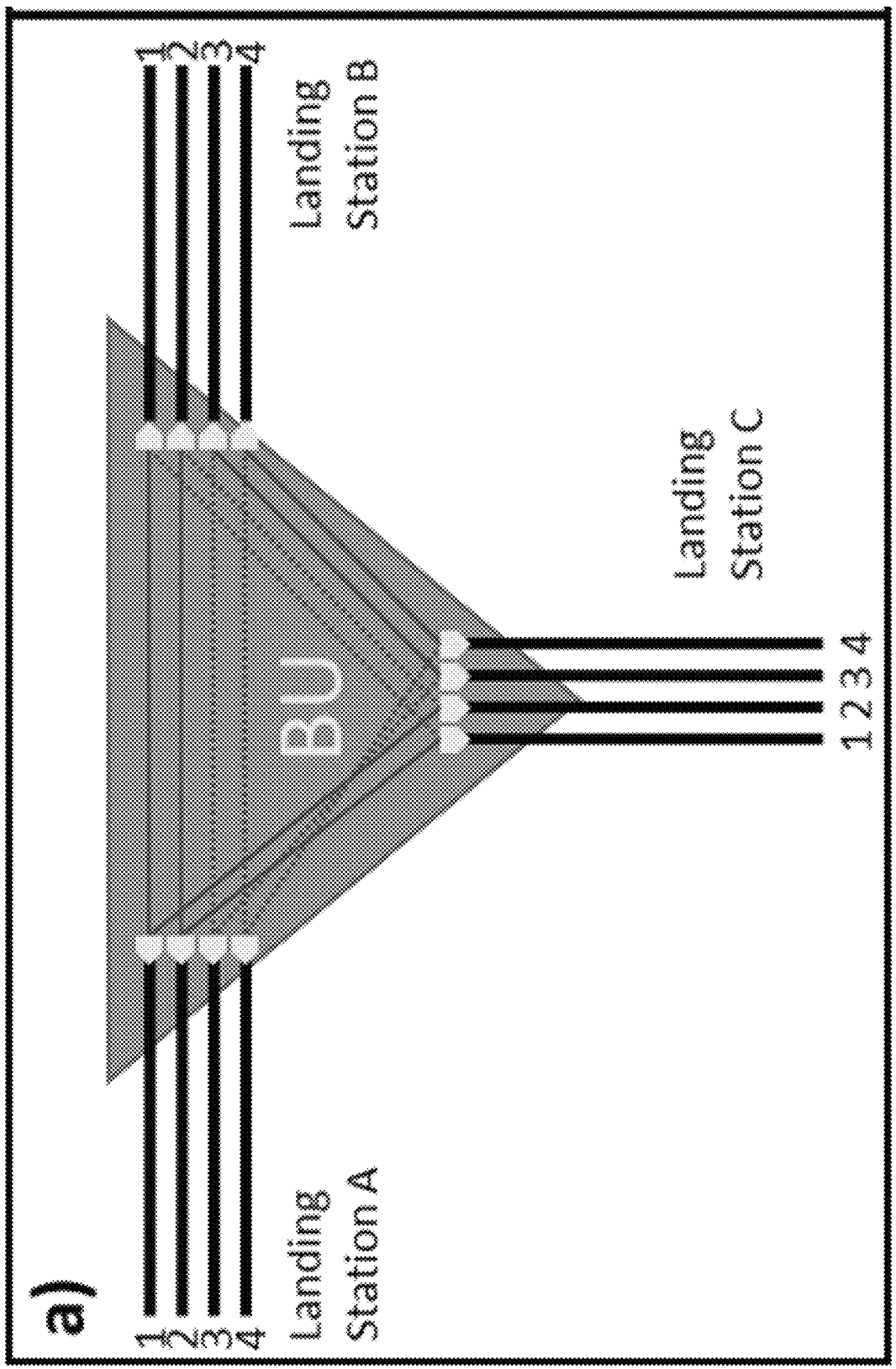
FIG. 5(A), FIG. 5(B), and FIG. 5(C) are schematic diagrams illustrating BU connectivity for a BU with 3-way switches in different states of the switches according to aspects of the present disclosure.
Figure 5B:
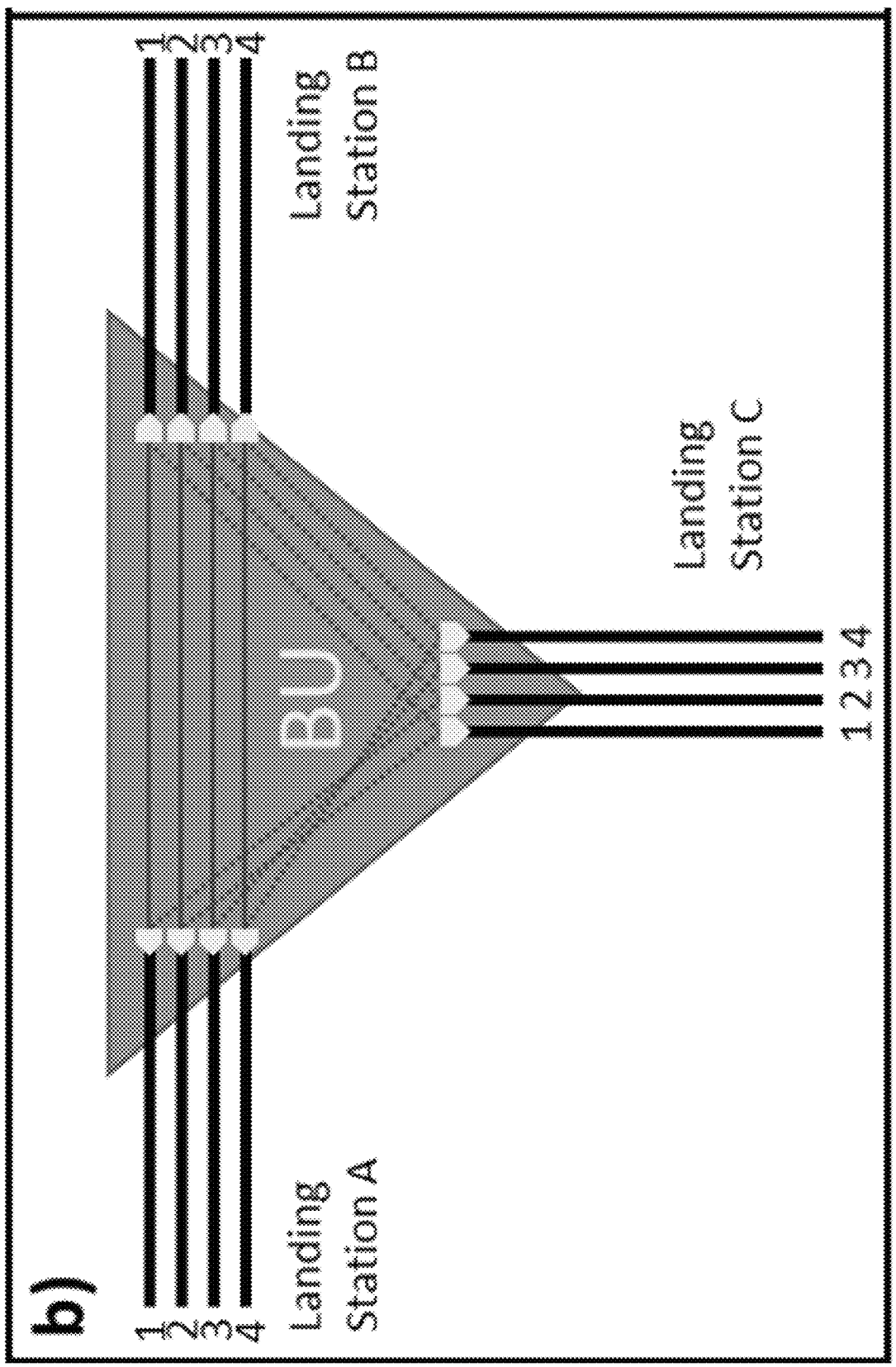
Figure 5C:
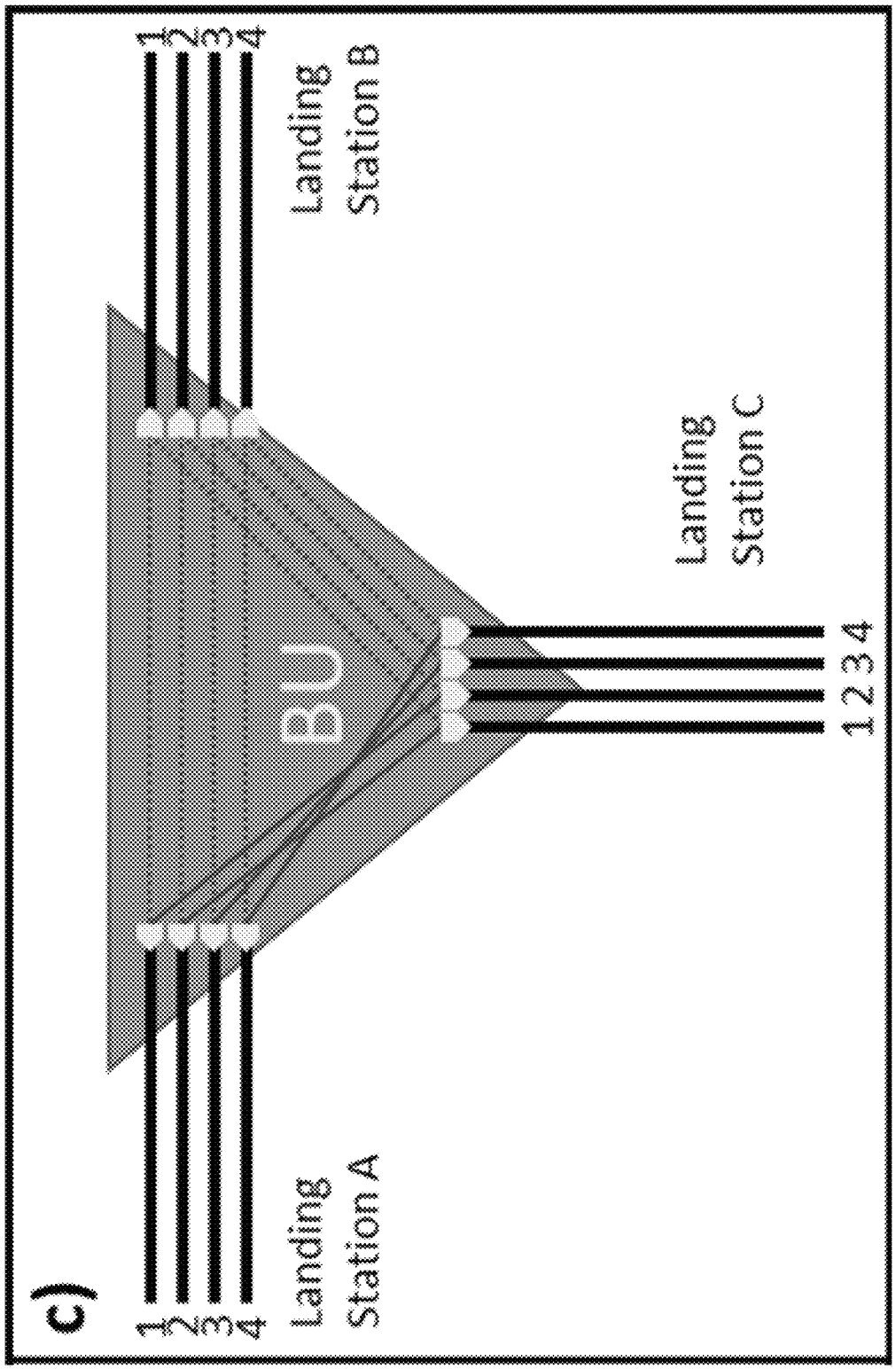

FIG. 5(A), FIG. 5(B), and FIG. 5(C) are schematic diagrams illustrating BU connectivity for a BU with 3-way switches in different states of the switches according to aspects of the present disclosure. With reference to these figures, we note that we can achieve 3-way switching capability for all fiber pairs by adding switches to all the fiber pairs from all the landing stations. In this case the connectivity can be configured provides both advantages presented in FIG. 4(A) and FIG. 4(B).

Indeed, FIG. 5(A) shows the same connectivity as FIG. 4(A), and FIG. 5(B) shows the same connectivity as FIG. 4(B). Furthermore, as it can be seen in FIG. 5(C), full protection of traffic can be achieved for any of the landing stations not just for traffic from landing station A. However, a major challenge and disadvantage of this way of achieving 3-way connectivity is that it requires three times the number of switches.

Our disclosure describes how to achieve 3WS functionality using low-cost reliable switches. As we shall show describe, we present two designs exhibiting with different advantages. Our first design exhibits a lowest overall insertion loss and uses 1×2 switches. Our second design is based on 2×2 switches a exhibits a slightly higher insertion loss however, it uses half as many switches, therefore it is more cost effective and occupies less space.

Figure 6:
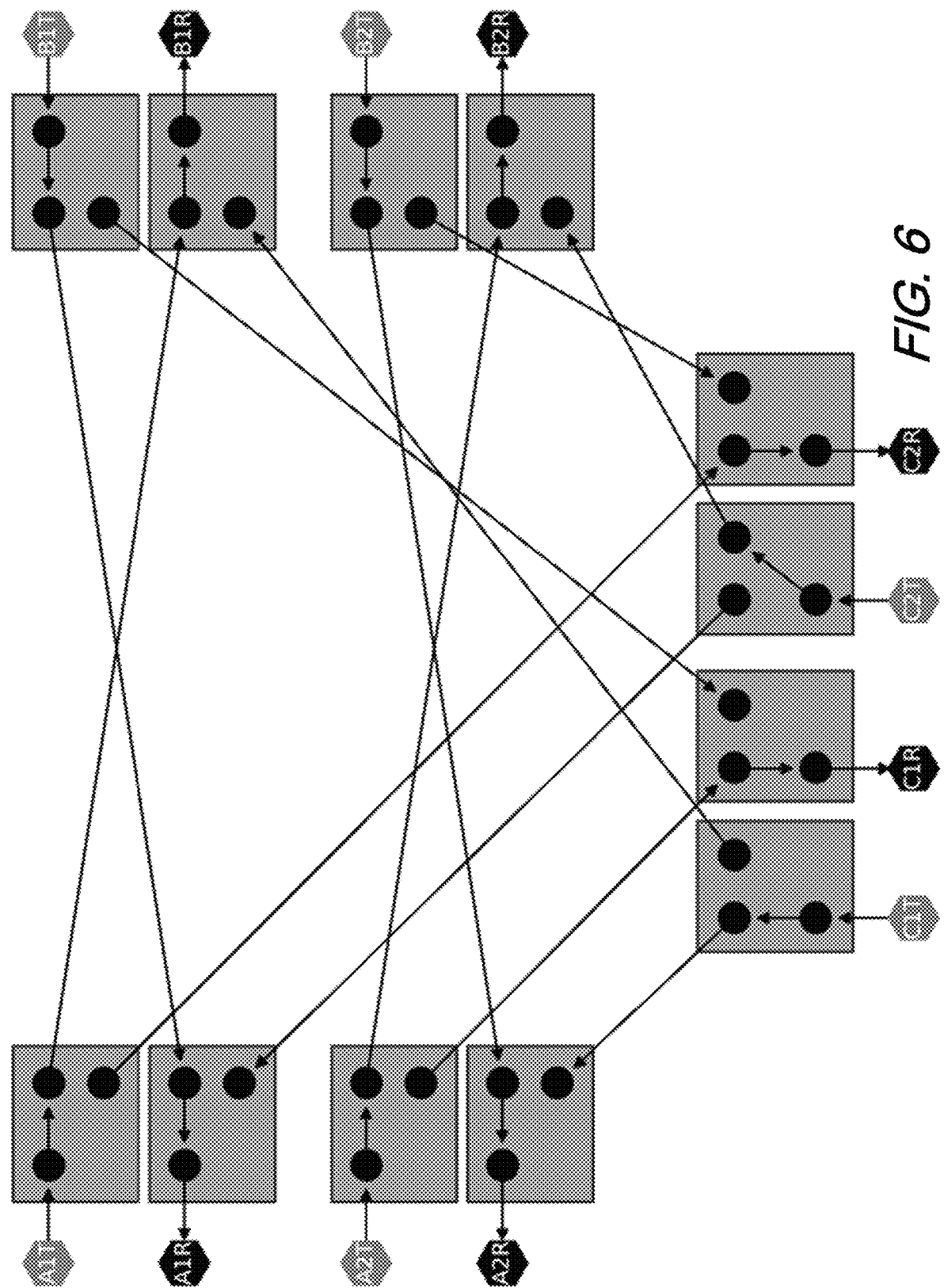
FIG. 6 is a schematic diagram illustrating a topology of our inventive 1×2 architecture according to aspects of the present disclosure.

FIG. 6 is a schematic diagram illustrating a topology of our inventive 1×2 architecture according to aspects of the present disclosure. Note that here we are explicitly drawing each fiber in the fiber pairs, as opposed to previous figures where we represented each fiber pair by a single line. In this case, since we are looking at a switching group consisting of 2 fiber pairs from 3 stations, that would make a total of 12 fibers. Connecting a 1×2 switch to each fiber means 12 1×2 switches. These switches can be identical and bi-directional, or they can be unidirectional, in which case the switches connected to the transmitter sides take the signal in the single circle port, and the switches connected to the receiver side takes the signal from either of the two circles. Each switch has two states that is independent of the other switches. Therefore, there are a total of $2^{12}=4096$ different possibilities that the module can be configured. Out of these 4096 states, we are interested in achieving 4 distinct states. These 4 states are summarized in Table 1 which defines the states as distinct settings of the switches that can configure a unique settings between the landing station. As an example, state1 provides 1 connection between each of the landing station, whereas state2 achieves 2 connections between landing station A and B and none between stations A and C as well as, none between stations B and C, etc.

With further respect to FIG. 6, we note that in the figure the hexagons show the fiber pairs connected to the switches, labeled as XnY, where X is A, or B or C, which corresponds to the landing station they are connected to, n is 1 or 2, which is the numbering of the fiber pair, Y is T or R which stands for transmitter or receiver respectively. For instance, A1R corresponds to the fiber in the fiber pair1 that connects the switch to the receiver in the landing station A. C2T is the fiber in fiber pair2 that brings signal from the transmitter in landing station C to the switch. Each rectangle corresponds to a single 1×2 switch. Inside each switch the 3 black circles represent the switching nodes. The single circle in the back establishes connection to either of the circles in the front at a time.

Figure 7:
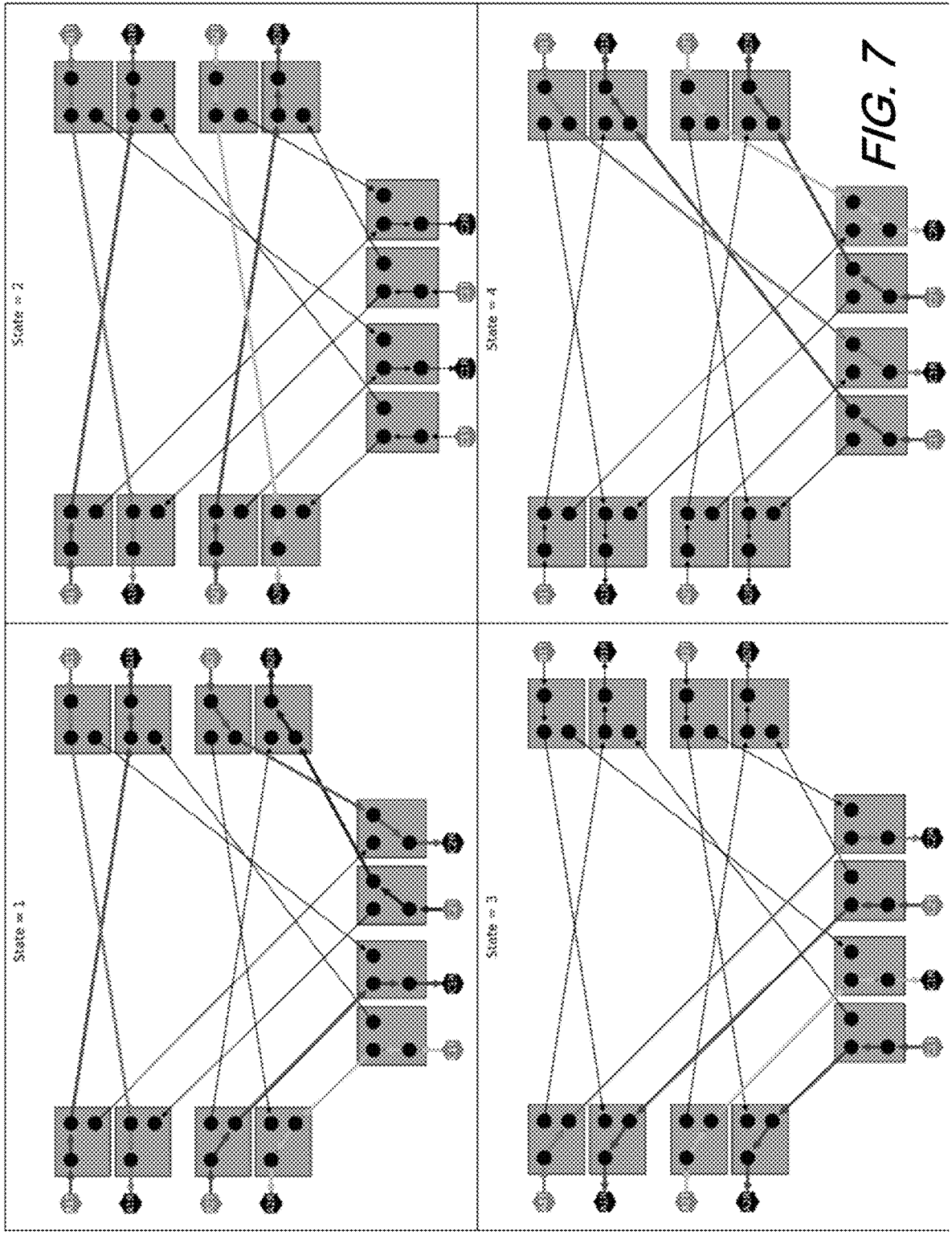
FIG. 7 is a schematic diagram illustrating 4 possible module states for an architecture that employs 12 1×2 switches according to aspects of the present disclosure.

FIG. 7 is a schematic diagram illustrating 4 possible module states for an architecture that uses 12 1×2 switches. The traffic carrying connections are shown with thicker colored arrows and thinner lines/arrows show the connections that do not carry any traffic. As shown in this figure, it may be observed how a 12 1×2 switch architecture can achieve all the 4 states outlined in Table 1. The arrows show the direction of the traffic and connections that do not carry traffic in that setting, wherein the thicker arrows show the connections that carry the traffic and their directions. In this architecture, there are indeed two ways to achieve state1. The alternative setting is shown in FIG. 4. It should be noted that in this architecture traffic in every connection is unidirectional.

Figure 8:
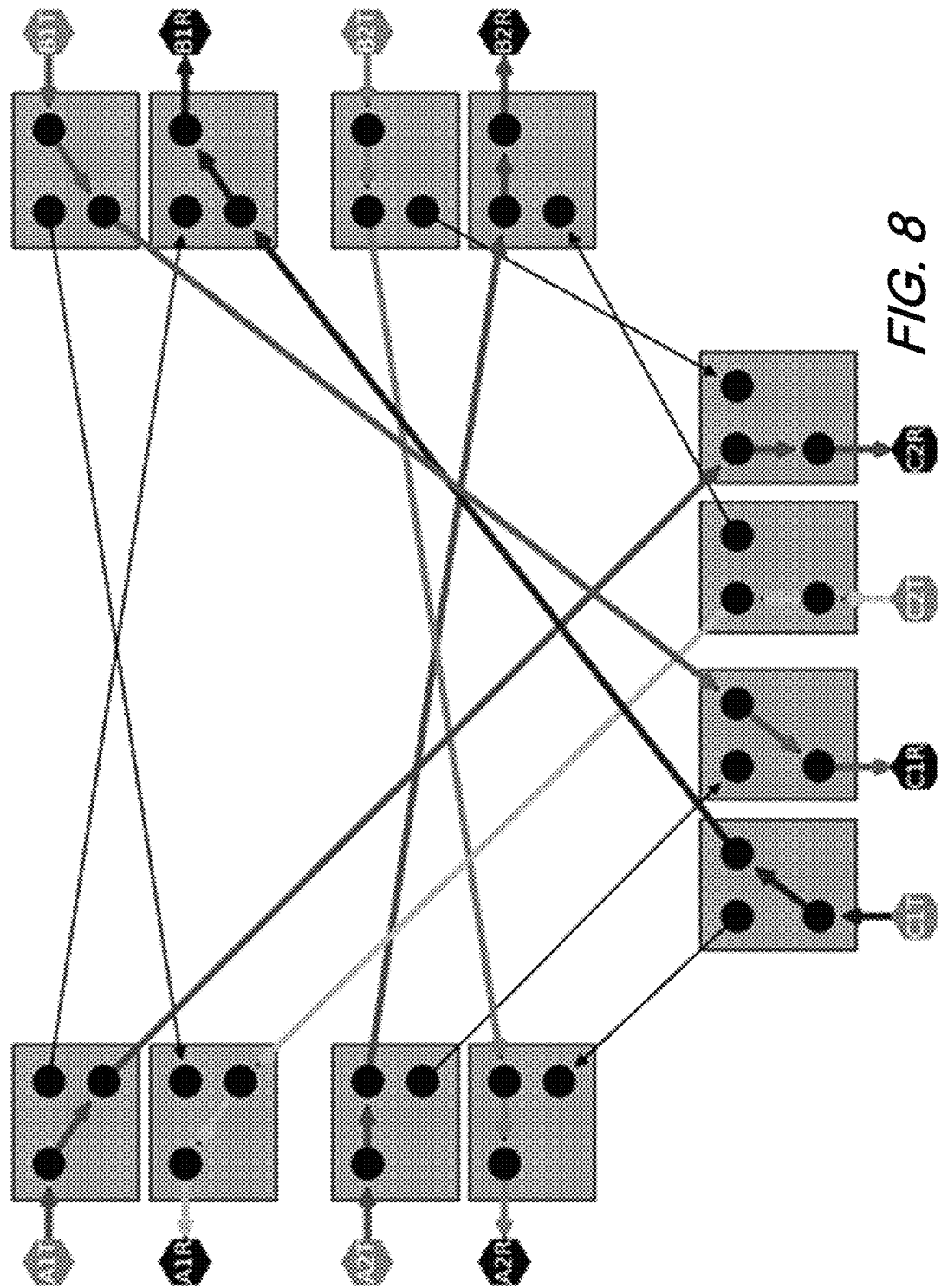
FIG. 8 is a schematic diagram showing an illustrative alternative setting for achieving State1 according to aspects of the present disclosure.

FIG. 8 is a schematic diagram showing an illustrative alternative setting for achieving State1 according to aspects of the present disclosure.

Figure 9:
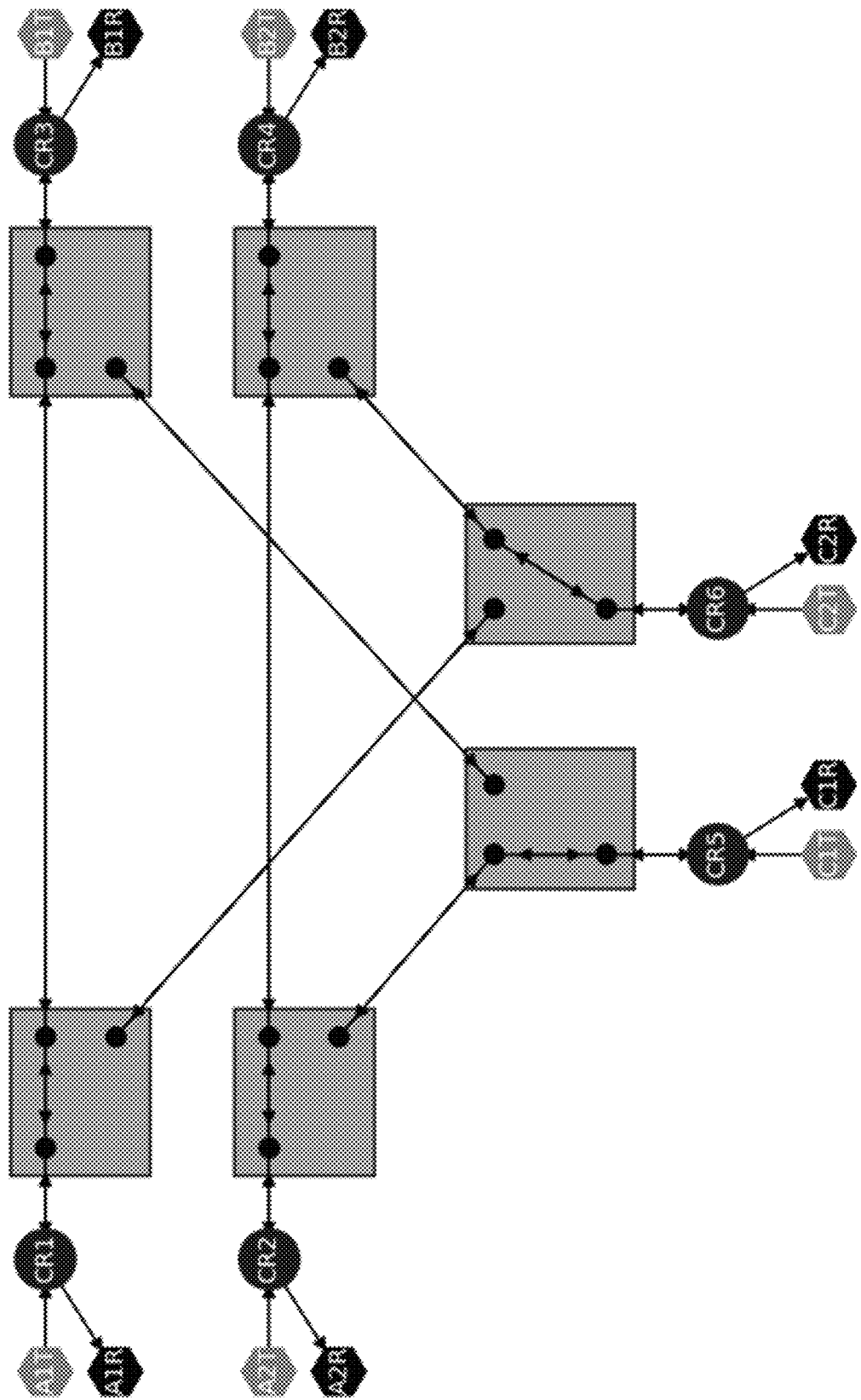
FIG. 9 is a schematic diagram of an illustrative switch and circulator design including 6 1×2 switches and 6 circulators in which circulators are shown as circles and arrows show the direction of traffic in each connection according to aspects of the present disclosure.

FIG. 9 is a schematic diagram of an illustrative switch and circulator design including 6 1×2 switches and 6 circulators in which circulators are shown as circles and arrows show the direction of traffic in each connection according to aspects of the present disclosure. In this design, the number of active components are reduced by half which increases overall module reliability. It also reduces space. FIG. 9 shows the architecture of this design.

Figure 10:
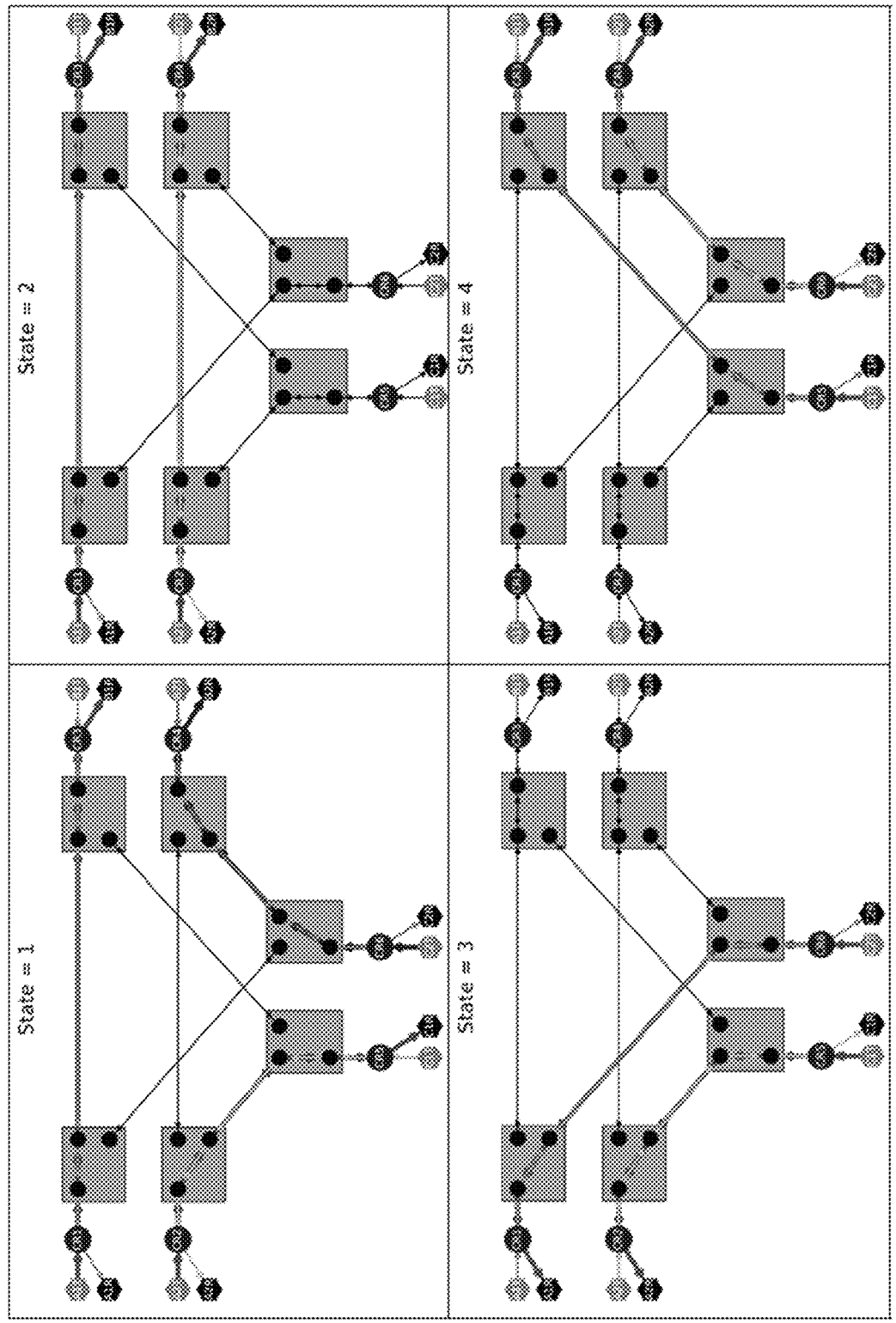
FIG. 10 which is a schematic diagram showing 4 possible module states for the architecture that uses 6 1×2 switches and 6 circulators according to aspects of the present disclosure.

We note that SwC can also achieve all the 4 states shown in Table 1 as it can be observed in FIG. 10 which is a schematic diagram showing 4 possible module states for the architecture that uses 6 1×2 switches and 6 circulators according to aspects of the present disclosure. The traffic carrying connections are shown with thicker arrows and lines/arrows show the connections that do not carry any traffic.

Those skilled in the art will know that a circulator is a passive component that directs the light depending on which port it receives it and in which direction. As an example, if we look at circulator 3 marked as CR3 in FIG. 10 in configuration State=1, the light arriving from B1T is directed to the port connected to the switch. The light arriving to the circulator from the switch is directed to the port connected to the fiber marked as B1R. Comparing the 12-switch design and SwC, we see that we reduced the number of active components (switches are active components) by half. Since passive components are less prone to failure, SwC design is expected to be more reliable. Moreover, circulators are expected to be smaller compared to switches and it is even possible to integrate switches and circulators into the same packaging. As a result, this design will have a advantageous smaller foot print as compared to the art.

Figure 11:
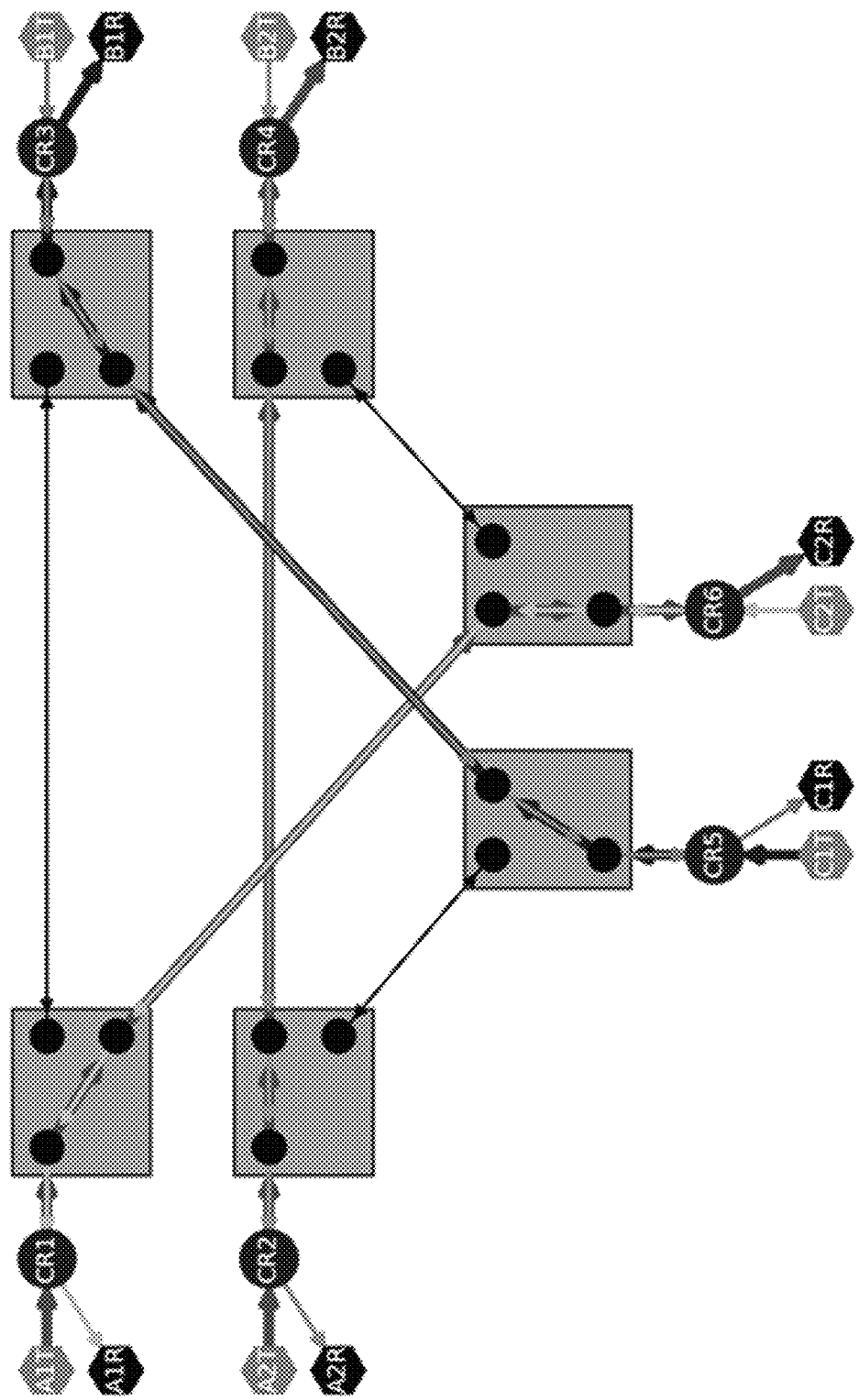
FIG. 11 is a schematic diagram showing an illustrative alternative setting for achieving State1 with SwC according to aspect of the present disclosure.

On the other hand there are two disadvantages to this design. First, in SwC, the circulators and the switches are placed in series. Therefore, the traffic experiences an insertion loss from both components (twice, so a total of 4 components). In contrast, in the 12-switch configuration, traffic experiences insertion loss from only two switches. Second, some of the connections carry traffic in both directions simultaneously as shown by the black arrows. That is usually an unwanted characteristic in some systems as it may lead to coherent interference Similar to the case of 12 switch configuration, there are two possible ways to achieve the State1 configuration in the case of SwC. The alternative configuration is shown in FIG. 11.

At this point we describe yet a third design that only requires 6 2×2 switches to achieve the 4 states in Table 1 which we refer to as the 6-switch design (6S). In this design we reduce the number of active components to only 6, and no need for additional circulators, therefore we avoid the extra loss from the circulators while also achieving fully unidirectional traffic.

Figure 12:
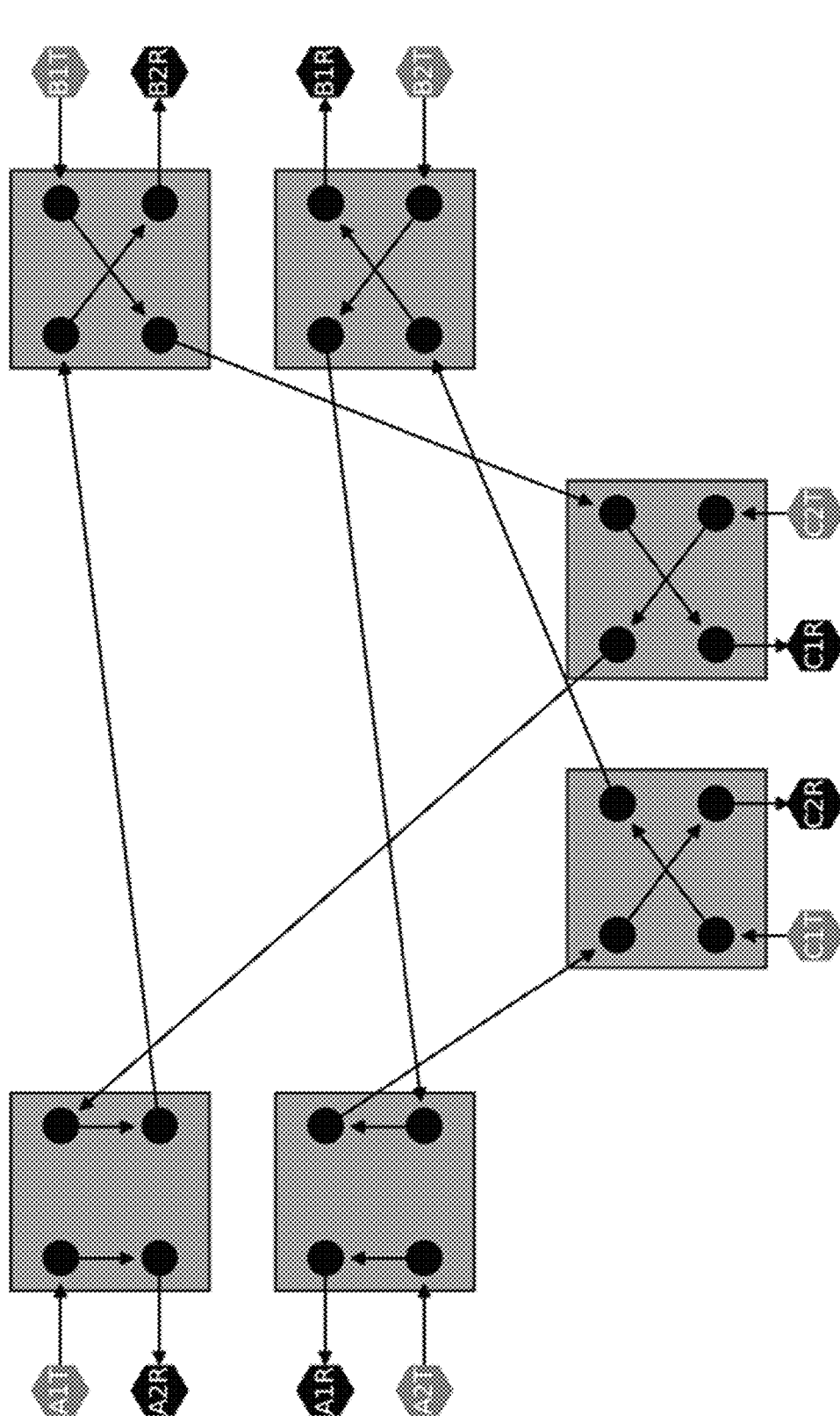
FIG. 12 is a schematic diagram showing illustrative topology of a 2×2 switching configuration according to aspects of the present disclosure.

FIG. 12 is a schematic diagram showing an illustrative topology of a 2×2 switching architecture according to aspects of the present disclosure. The hexagons show the fiber pairs connected to the switches, labeled as XnY, where X is A, or B or C, which corresponds to the landing station they are connected to, n is 1 or 2, which is the numbering of the fiber pair, Y is T or R which stands for transmitter or receiver respectively. For instance, A1R corresponds to the fiber in the fiber pair1 that connects the switch to the receiver in the landing station A. C2T is the fiber in fiber pair2 that brings signal from the transmitter in landing station C to the switch. Each brown rectangle corresponds to a single 2×2 switch. Inside each switch the 4 circles represents the switching nodes. The four switching nodes are either connected.

Figure 13:
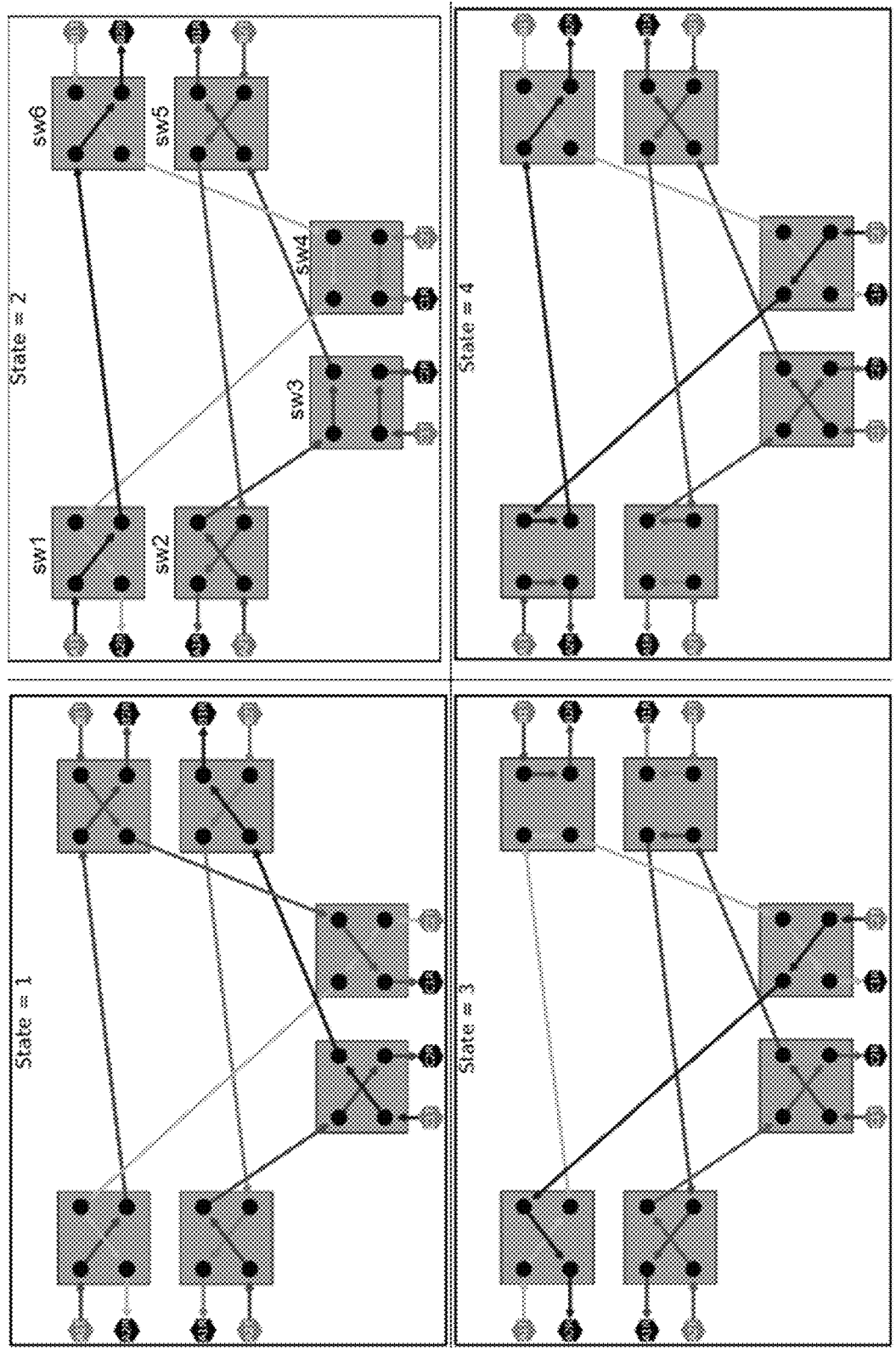
FIG. 13 is a schematic diagram illustrating 4 possible module states are shown for the architecture that uses 6 2×2 switches only according to aspects of the present disclosure.

The connections to achieve the 4 states in Table 1 is shown schematically in FIG. 13 which is a schematic diagram illustrating 4 possible module states are shown for the architecture that uses 6 2×2 switches only.

We can now we explain in more detail how we achieve all the four states in Table 1. To achieve State1, i.e., 1 connection each between A and B, And C, and B and C, red line shows the traffic flow from A1T to B2R (A1T: transmitter connected to fiber pair 1 at landing station A, B2R: receiver connected to fiber pair 2 in landing station B), whereas light red arrow shows the returning traffic from B2T to MR. The green arrow shows the traffic flow from A2T to C2R, and the light green arrow shows the returning traffic from C2T to A2R. The blue arrow shows the traffic flow from C1T to B1R, and the light blue arrow shows the returning traffic from B1T to C1R.

Similarly, to achieve State2, i.e., 2 connections between A and B with no connections to landing station C. In this case even though no connection is made to the landing station in C, we still make use of switches connected to fiber pairs connected to landing station C. We labeled the switches to describe the State2. Like the State1 case, as shown by the blue arrow, traffic goes from A1T through sw1 and sw6 to B2R. In the return path as shown by the light blue arrow B2T is connected to A1R through sw6 and sw1. Since there should be two connections established between landing stations A and B, we need a second connection. That connection should connect A2T to B1R, and B2T to A1R. But there is no direct connection between sw2 and sw5 which are connected to A2T and B1R, respectively. Therefore, we can connect sw2 and sw5 through sw3 since landing station is not connected. Similarly, a connection between sw1 and sw6 can be patched through sw4 so that BIT can be connected to A2R.

Note that for States 2, 3, and 4, some of the connections must go through a total of 3 switches instead of 2 switches only as in the case of first design with 12 1×2 switches.

Another advantage of using this last design configuration with the 6 2×2 switches is that when a landing station is not connected to any other landing station, traffic is automatically routed back. For instance, for the case of State2 where landing station C is disconnected, the traffic from C1T is routed back to C1R and traffic from C2T is routed back to C2R. We compare this to the first design with 12 1×2 switches where in the case of State2, traffic from C1T and C2T are blocked at the switches, and there is no traffic returning to C1R and C2R. In submarine systems typically all the amplifiers in the links are kept always on, and they are configured to have a certain input power for their designed operation, especially for proper monitoring of the amplifiers and the link. As a result, in the case of design 6S, there is always traffic going down the link connected to the receivers at or close to the design power level.

We can now show and describe how to further integrate design 3. However, to explain the most effective way to do this integration we will cast design 3 in a slightly different way even they are analogous.

Figure 14:
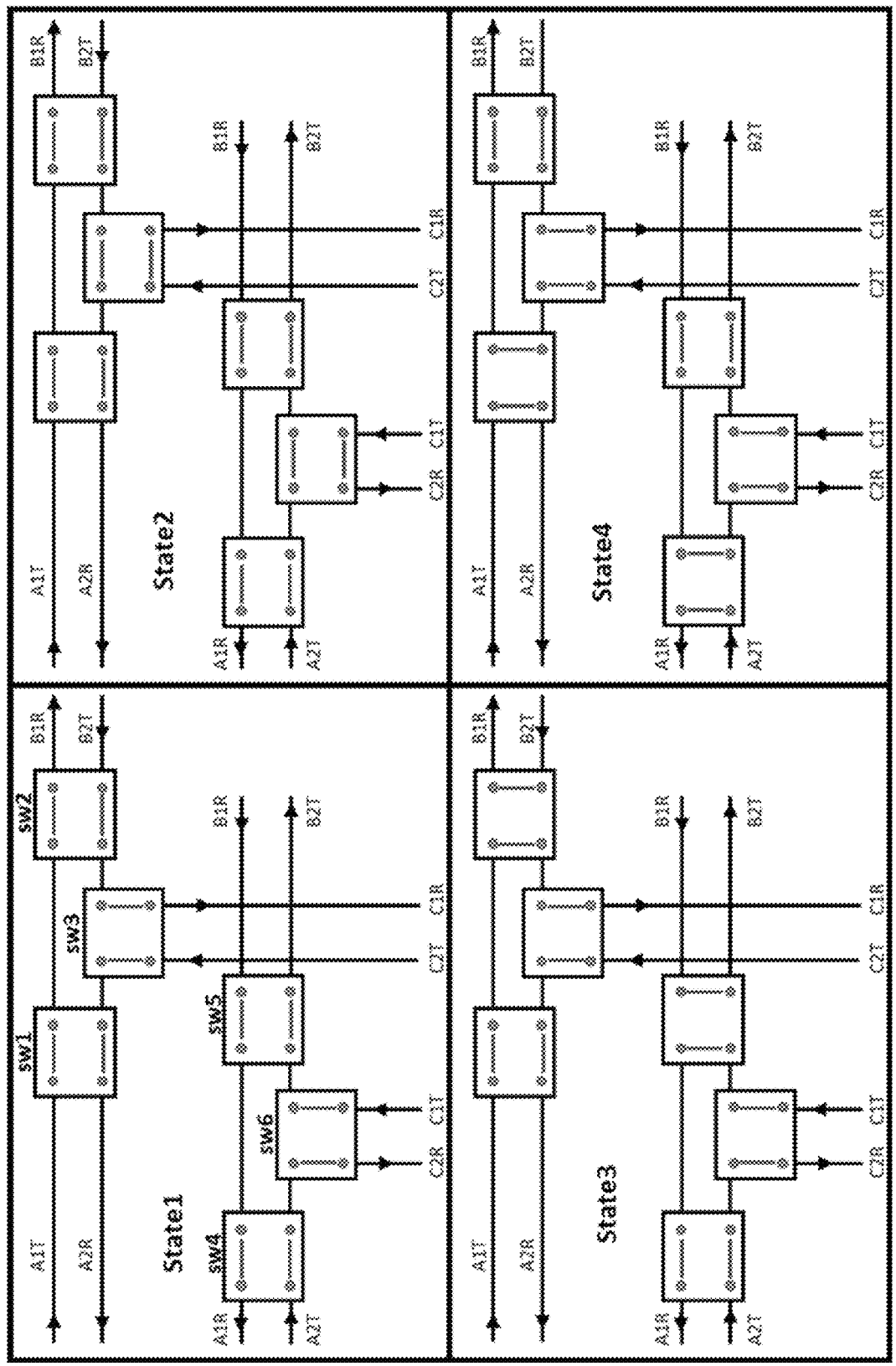
FIG. 14 is a schematic diagram illustrating 4 possible module states for a configuration that includes 6 2×2 switches only according to aspects of the present disclosure.

FIG. 14 is a schematic diagram illustrating 4 possible module states are shown for the architecture that uses 6 2×2 switches only according to aspects of the present disclosure. Connections inside the switches and connections between the switches are shown.

Even though it may not be apparent at first glance that the configurations of FIG. 14) and FIG. 13) are analogous, it can be verified easily that they both provide the same functionality of the 4 states in Table 1.

TABLE 1

| States/Connections | AB | AC | BC |
|---|---|---|---|
| 1 | 1 | 1 | 1 |
| 2 | 2 | 0 | 0 |
| 3 | 0 | 2 | 0 |
| 4 | 0 | 0 | 2 |

Figure 15A:
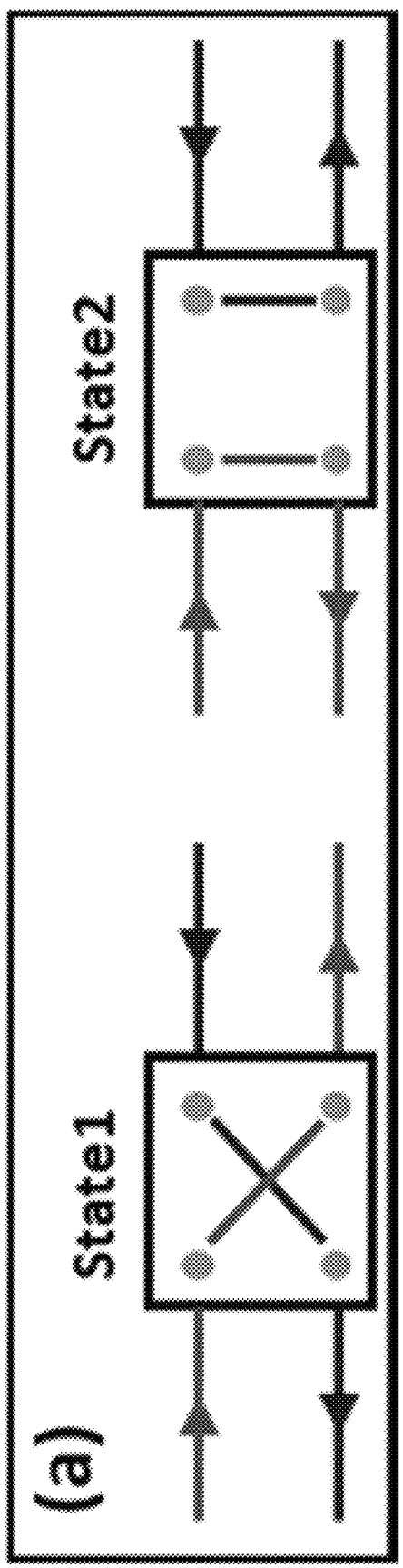
FIG. 15 (A) and FIG. 15 (B) are schematic diagrams illustrating.
Figure 15B:
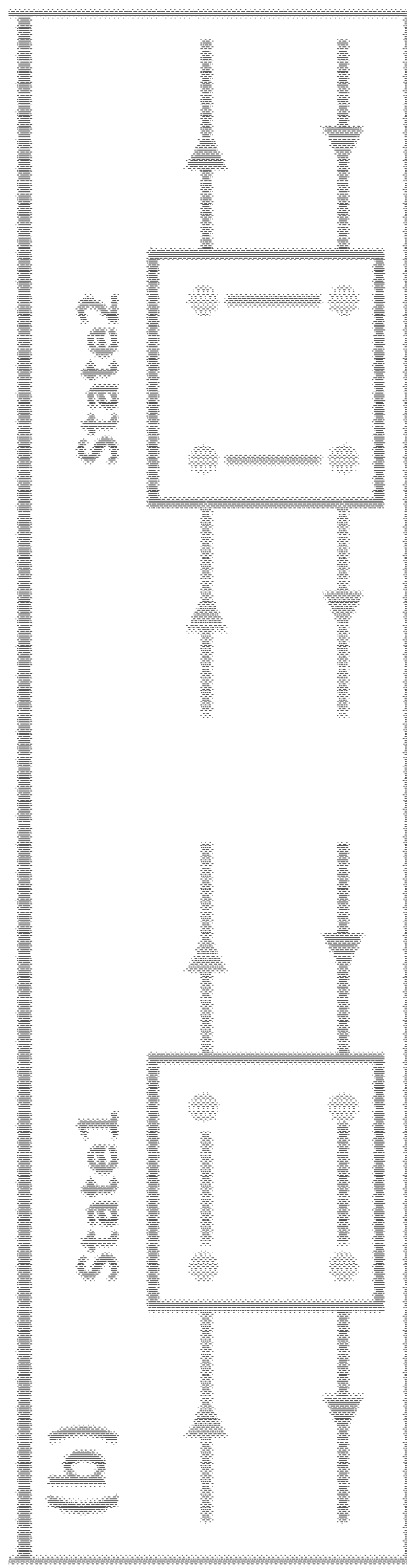

FIG. 15 (A) and FIG. 15 (B) are schematic diagrams illustrating: FIG. 15 (A) the two states of the 2×2 switch configuration used in FIG. 13; and FIG. 15 (B) the two states of the 2×2 switch configuration used in FIG. 14, according to aspects of the present disclosure.

To facilitate a further understanding of why the architecture in FIG. 13 and FIG. 14 are analogous, FIG. 15 (A) and FIG. 15 (B) show the functional diagrams of the 2×2 switches used in these two cases. In both cases the 2×2 switches have two possible states: pass-through or reflect. In the figure, the pass-through state has a cross-over which can happen depending on the design choice of the switch, however, it can be seen clearly that these two switches perform the same function as one can be converted to the other by flipping which fiber is connected to which end on the left-hand side.

FIG. 14 shows clearly that the connection of the switching group can be divided into two disjoint groups. The group above includes A1T, A2R, B2T, B1R, C2T and C1R connected together by the 3 switches sw1, sw2, sw3 and the group below consists of A1R, A2T, B2R, B1T, C1R and C1T connected by the remaining 3 switches sw4, sw5, sw5. Since the connection between these two groups are substantially identical, we can first focus on the integration of these two groups of 3 switches. Basically, we will consider mainly integrating 3 2×2 switches.

As emphasized earlier, in the case of the design configuration with the 2×2 switches all the connections between the switches as shown in FIG. 14 are carrying traffic in all 4 states. In addition, which is critical in motivating the integrated design the connections between the switches are fixed. This provides for the first level of integration, which is reduce the length of the fiber pigtail between the 3 switches as short as possible. In fact, one of the largest spaces is wasted by just providing sufficient protection for the fiber pigtails entering or leaving the switches. From here on, we will call this the first level integration, for which the main characteristic is that the fiber pigtails are kept short enough between the switches so that a protective sleeve is not needed and removed.

Now we will explain how we can move to the second, and a deeper level of integration. In essence, what we do is we recognize that since the connections among sw1, sw2, and sw3 are fixed, we can remove the unnecessarily repeated fiber coupling stages. To explain this further, in FIG. 16 we show an example diagram of a 2×2 switch capable of the functionality shown in FIG. 15.

Figure 16:
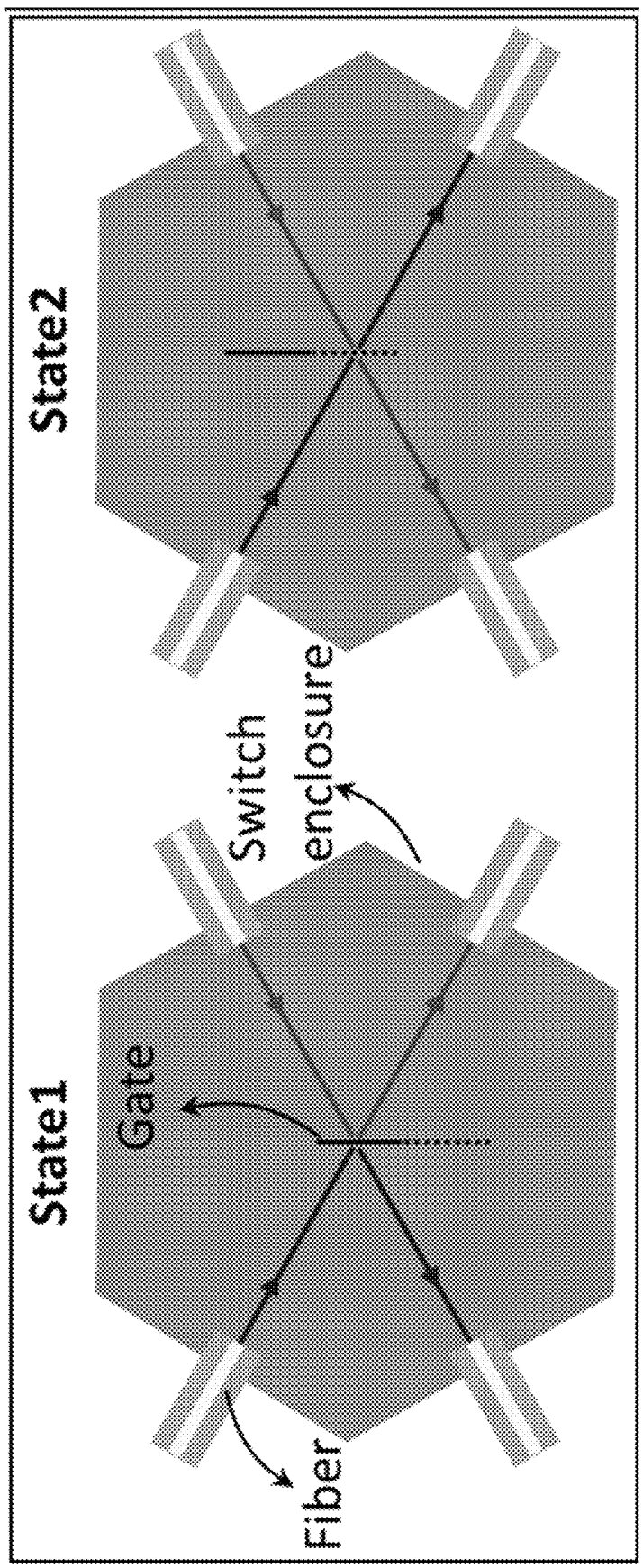
FIG. 16 is a schematic diagram illustrating an example of a 2×2 switch according to aspects of the present disclosure in which two inputs at the top and the two outputs at the bottom are fiber coupled and it includes a switchable gate that switch the traffic between the two states.

With reference to FIG. 16 that is a schematic diagram illustrating an example of a 2×2 switch according to aspects of the present disclosure in which two inputs at the top and the two outputs at the bottom are fiber coupled and it includes a switchable gate that switch the traffic between the two states. Light from two input fibers is coupled to two output fibers at the bottom after going through a switchable gate. The gate can be made through different mechanisms however, a simplest example would be a two-sided reflective surface adjacent to a transparent surface which can be inserted in and out of the paths of the lights. Such an example of a gate is shown schematically in FIG. 17.

Figure 17:
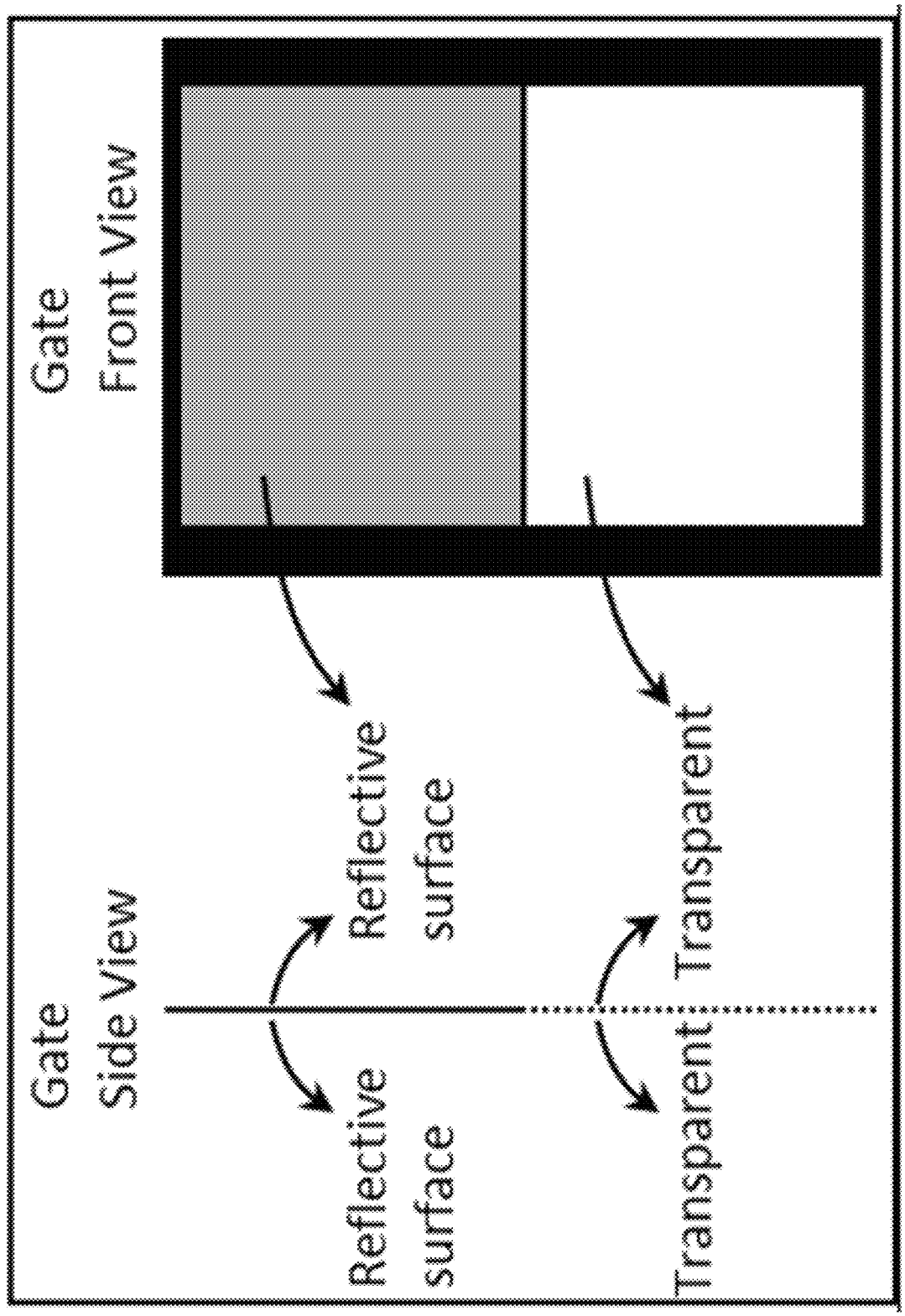
FIG. 17 is a schematic diagram illustrating an example of a switchable gate having a two sided reflective surface adjacent to a transparent region wherein dotted lines corresponds to the transparent section and the solid line corresponds to the reflective section according to aspects of the present disclosure.

FIG. 17 is a schematic diagram illustrating an example of a switchable gate having a two sided reflective surface adjacent to a transparent region wherein dotted lines corresponds to the transparent section and the solid line corresponds to the reflective section according to aspects of the present disclosure.

It can be seen by inspection of FIG. 16 and FIG. 17 that by moving the mirror in an out of the path of the lights the switch can be changed between the through and reflective states shown previously in FIG. 15. A side note is that in this example the light incident on the mirror makes 30° with the surface normal, however, the angle can be chosen almost arbitrarily as long as all the fibers are aligned accordingly.

Figure 18:
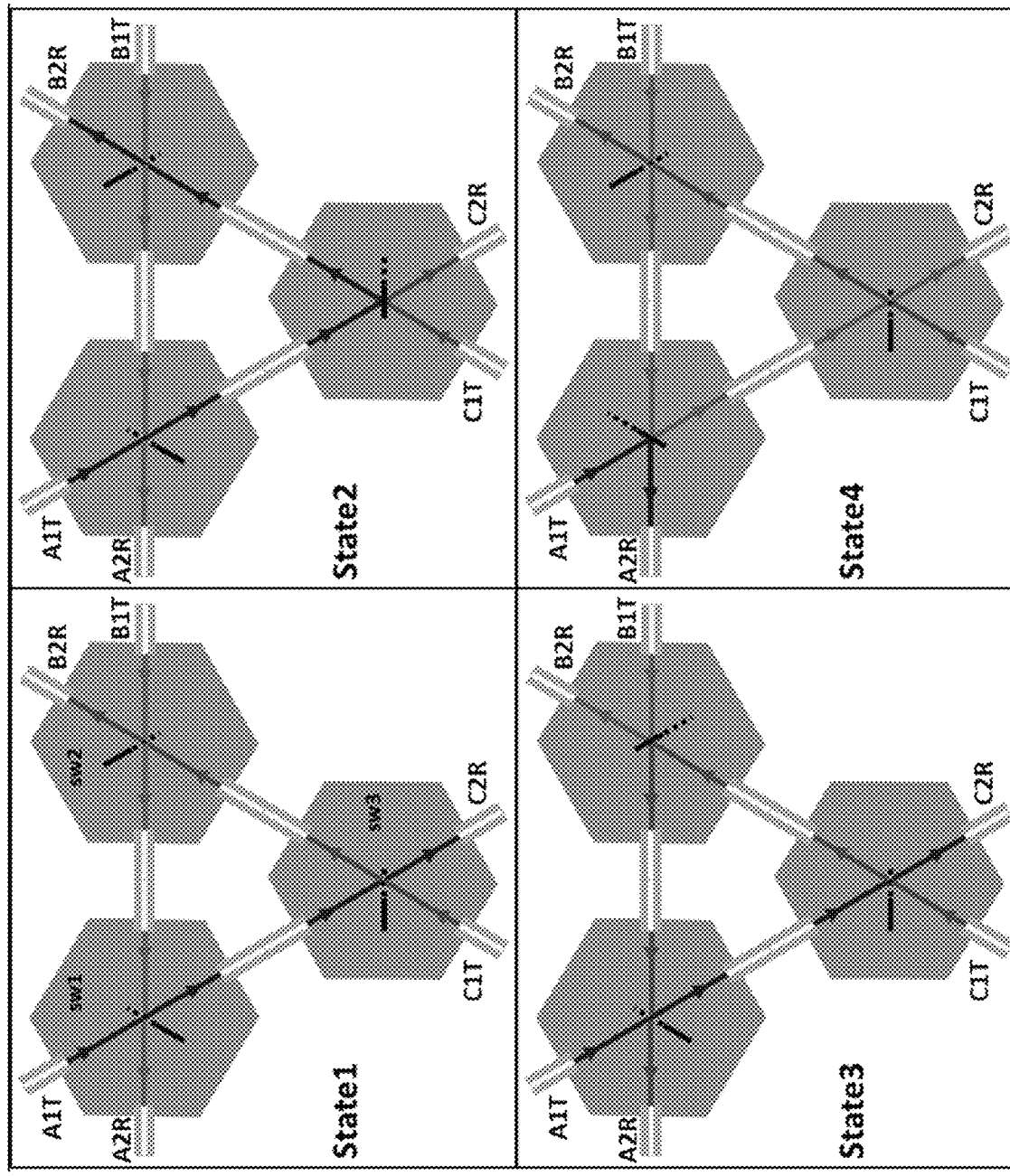
FIG. 18 is a schematic diagram illustrating three switches sw1, sw2 and sw3 as shown in FIG. 14 configured in a simple way so that they can easily be integrated at a first level according to aspects of the present disclosure.

FIG. 18 is a schematic diagram illustrating three switches sw1, sw2 and sw3 as shown in FIG. 14 configured in a simple way so that they can easily be integrated at a first level according to aspects of the present disclosure. As may be observed, in FIG. 18 we show how the example switch configuration in FIG. 16 can be combined to obtain the functionality of the three switches sw1, sw2, and sw3 in FIG. 14 can be obtained. It is apparent that this same configuration can be used to achieve the functionality of the switches sw4, sw5 and sw6. We can see how the configuration in FIG. 18 can be used for the first level integration. In the illustrative configuration shown in FIG. 18, the input and output fibers that connect the switches together are retained. The length of these fibers is not specified; however they can be rendered short enough and protected within the housing of the integrated switches so that a fiber protective sleeve would not be necessary, and therefore a substantial space saving can be achieved. Moreover, since these fibers can be well protected and short, they would be more reliable.

Figure 19:
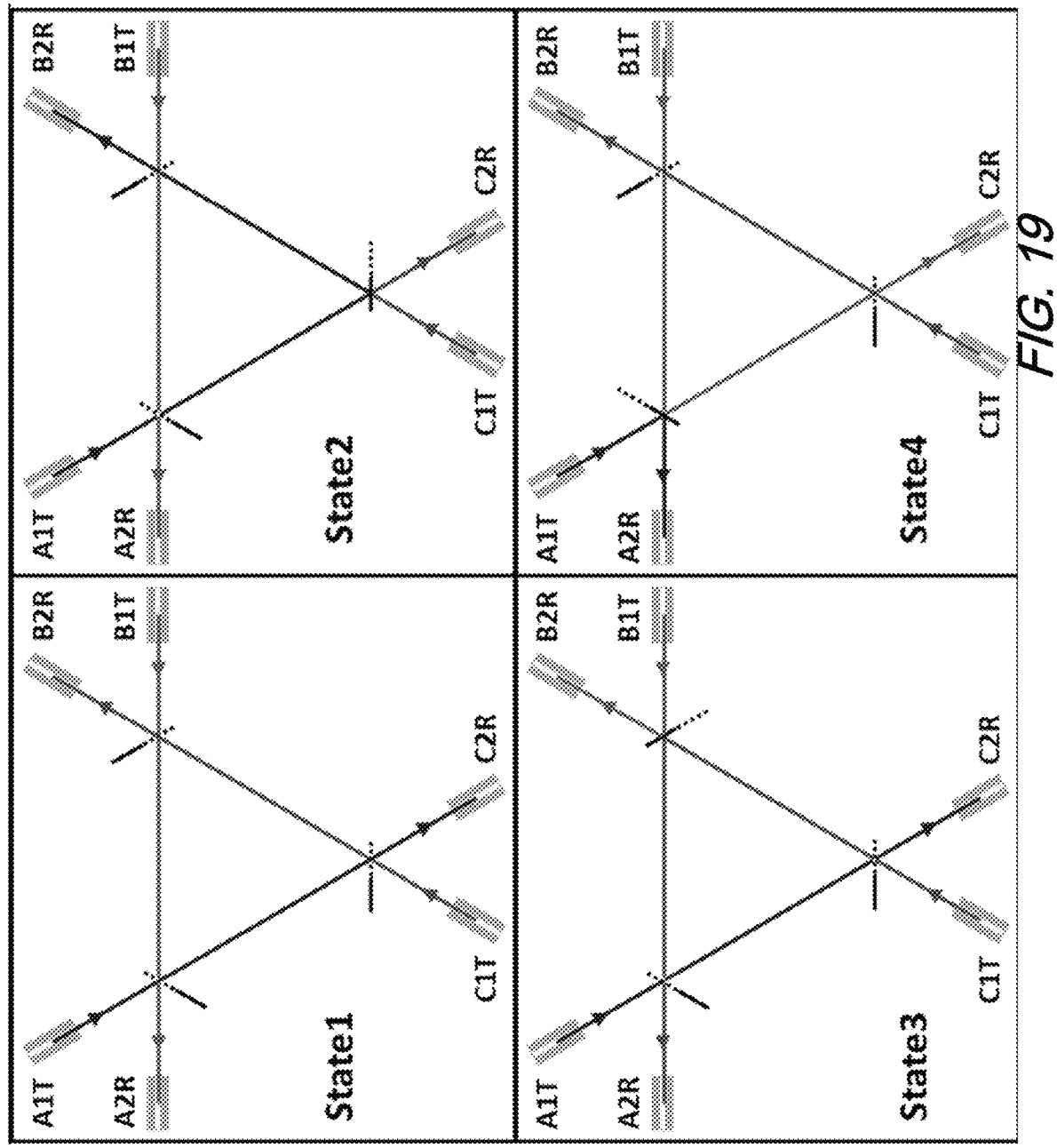
FIG. 19 is a schematic diagram illustrating three switches sw1, sw2 and sw3 shown in FIG. 14 configured in a simple way so that they can easily be integrated at a second level according to aspects of the present disclosure.

An inspection of the configuration illustrated in FIG. 18 should make it clear that coupling the light into an out of the fibers in between the switches is not necessary and they can be removed to achieve the second level of integration, which is shown in FIG. 19.

One can see that the required functionality of the 3-way switch can be attained by integrating the three switches sw1 sw2, and sw3 in FIG. 14 by integrating 3 switches in the form shown in FIG. 19. As explained above the required 6 switches reduce to the identically configured two groups of 3 switches.

According to aspects of the present disclosure, the 3 switches can be replaced by the configuration shown in FIG. 19. One can see that only by moving three mirrors in and out of the light paths, we can achieve the 3-way switch functionality. Going from first level integration to the second level, i.e., from the configurations shown in FIG. 18 to the configurations shown in FIG. 19, it is clear that the switch can be made much more compact as all the fibers and fiber coupling components can be removed. This would reduce size, reduce insertion loss, and improve reliability as less components are used.

Figure 20:
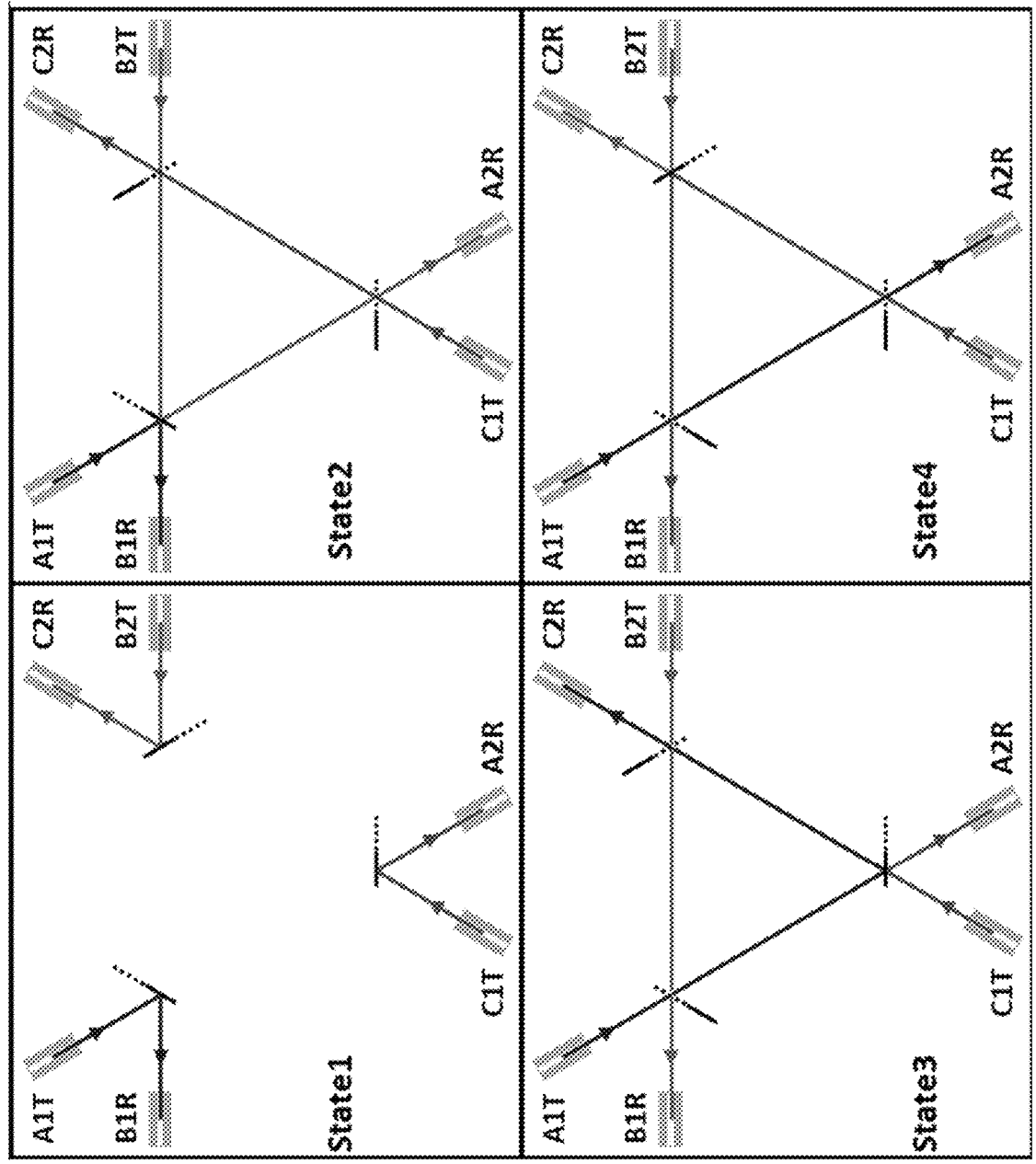
FIG. 20 is a schematic diagram illustrating an analogous version of the configuration shown in FIG. 19 according to aspects of the present disclosure.

We note that the design illustrated in FIG. 19 can be configured in a similar fashion as shown in FIG. 20. The only difference is which connections experience multiple reflections off of the mirrors and which one experience none or only a single reflection. These may prove advantageous to different applications In explaining the configuration shown in FIG. 16, we had mentioned that the switch can be configured in different ways, in particular the angle of incidence with the mirror surface normal can be varied. One particularly important angle of incidence is 45° as this angle may prove to be easier for alignment and other purposes. Even though the configuration can be expanded to many different angles we will show a particular example with the 45° incidence angle in FIG. 21.

Figure 21:
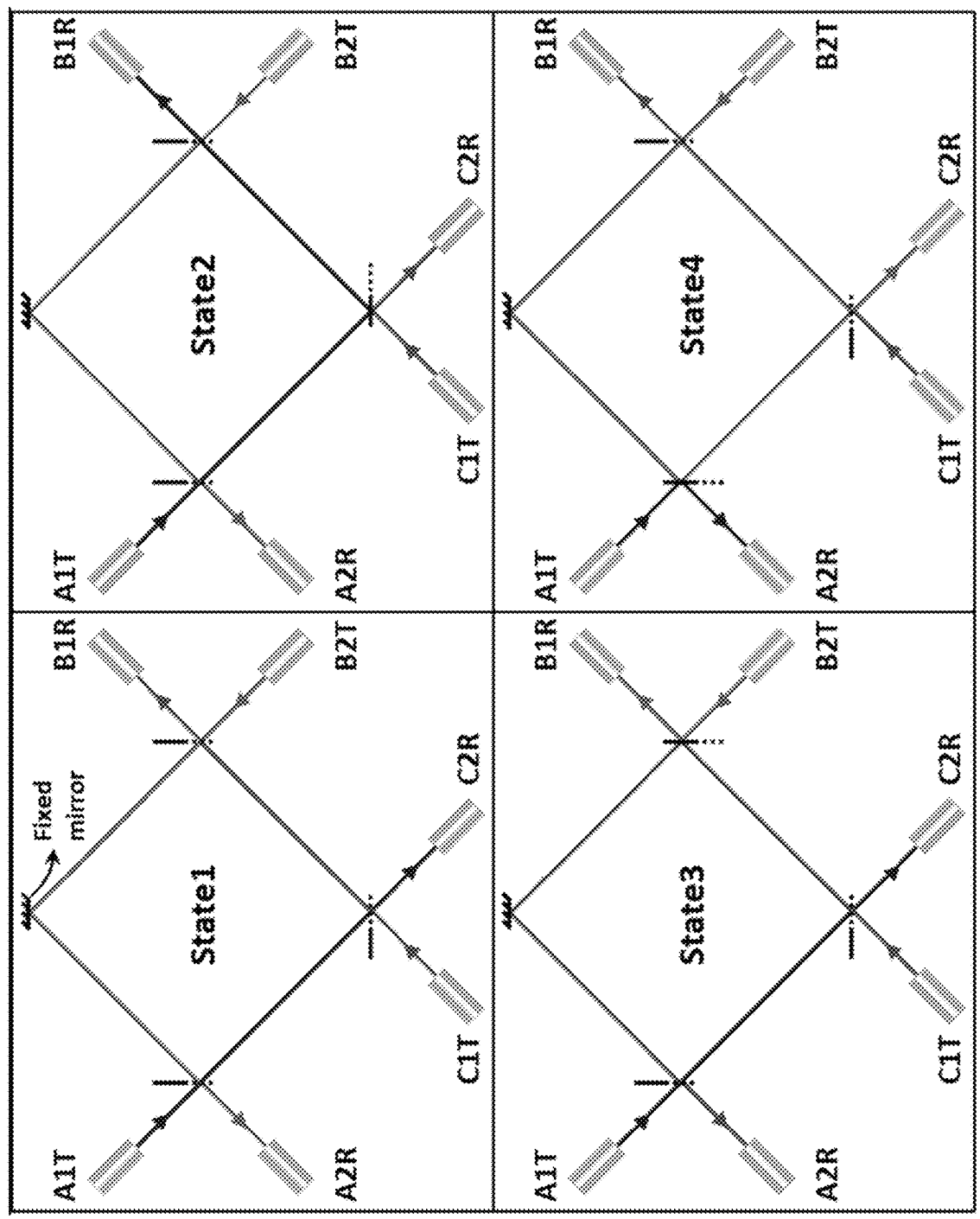
FIG. 21 is a schematic diagram illustrating an integrated switch configuration having 45° incidence angle wherein a fixed mirror is included at the top according to aspects of the present disclosure.

FIG. 21 is a schematic diagram illustrating an integrated switch configuration having 45° incidence angle wherein a fixed mirror is included at the top according to aspects of the present disclosure. Note that like the relation between FIG. 19 and FIG. 20, analogous designs to FIG. 21 can be made.

We note that even though in general one can design 1×3 switches to achieve the 3-way switches such switches are more complicated compared to 2×2 switches. They would either require adjustment of more gates, e.g, mirrors, or adjustment of gates in multiple angles. Both of these choices makes these components less reliable for the example applications we mentioned above. This is particularly true when latching functionality is required, again true for the example application above. Latching functionality means in the case of loss of power, the switch retains its final setting or reverts to a pre-determined setting. We picked our examples highlighting the simplicity that requires adjustment of gates to either on (in our examples mirror in), or off position (in our example mirror out of the light path). Such simplicity provides the required level of reliability.

We note further that even though our examples of gate functionality were through mirror, they can be in other forms, however the principle remains as our design relies on combining three switches together and removing the fiber coupling part out. We would like to reiterate our last point in a different way. Simplest and most reliable versions of the switches are 1×2. However, recently 2×2 switches with latching functionality are also becoming more and more available most of them relying on the fact that they can achieve this functionality with very simple set ups. No matter what the underlying simple mechanism is by making use of the simple geometry and the fact that the connections between the switches are fixed we can easily integrate them further by removing the fiber coupling parts. Since the switching mechanism is already simple and sufficiently reliable, the integrated version should also be as reliable, and since uses less components it should be even more reliable At this point, while we have presented this disclosure using some specific examples, those skilled in the art will recognize that our teachings are not so limited. Accordingly, this disclosure should be only limited by the scope of the claims attached hereto.

The invention claimed is:

1. A 3 way branching unit switch module for undersea optical communications configured to be connected to first, second, and third optical cables, each of the optical cables in optical communication with a respective landing station A, B, or C, the module comprising:
    six switches configured as:
        a first pair of switches in optical communication with the first optical cable;
        a second pair of switches in optical communication with the second optical cable; and
        a third pair of switches in optical communications with the third optical cable;
    wherein the first, second and third pair of switches each have one switch of their pair in optical communication with one of the other two pair of switches and the first, second and third pair of switches each have the other switch in their pair in optical communication with the other one of the other two pair of switches;
    wherein each switch includes a circulator optically connecting a respective optical fiber of the optical cable to a respective port;
    wherein the landing stations are configured to provide one state of connectivity to the landing stations
    A, B, and C selected from the group consisting of:
        a first state of connectivity consisting of one connection between landing stations A and B, and one connection between landing stations A and C, and one connection between landing stations B and C;

a second state of connectivity consisting of two connections between landing stations A and B, and no connections between landing stations A and C, and no connections between landing stations B and C;

a third state of connectivity consisting of no connections between landing stations A and B, and two connections between landing stations A and C, and no connections between landing stations B and C; and a fourth state of connectivity consisting of no connections between landing stations A and B, and no connection between landing stations A and C, and two connections between landing stations B and C.

2. The branching unit switch module of claim 1 wherein each of the switches is a 1×2 switch having 3 ports.

3. The branching unit switch module of claim 2 wherein one port of every switch is optically connected to an individual optical fiber of the optical cable to which it is optically connected.

4. The branching unit switch module of claim 3 wherein two ports of every switch are individually and optically connected to the other two switches, one port per switch.

5. The branching unit switch module of claim 4 wherein each pair of the first, second, and third pair of switches are connected to a transmit fiber and a receive fiber of its respective optical cable.

6. The branching unit switch module of claim 1 wherein each circulator is optically connected to a transmit and receive fiber of the optical cable and to a respective switch.

7. The branching unit switch module of claim 2 wherein each of the switches is a 2×2 switch.

\* \* \* \* \*